May 8, 1945.   L. M. POTTS   2,375,383
SELECTIVE SIGNALING SYSTEM
Filed Jan. 17, 1929    15 Sheets-Sheet 1
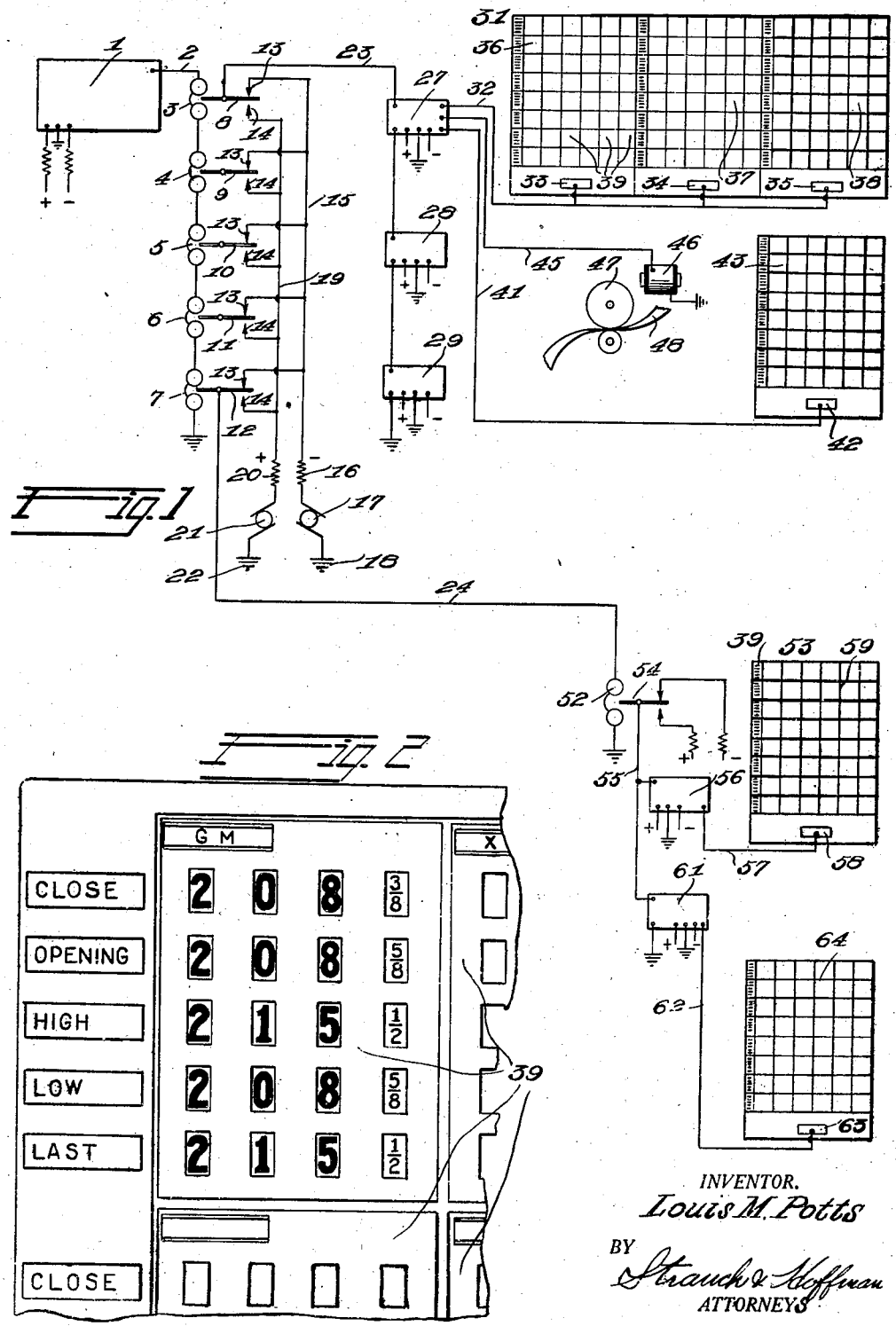
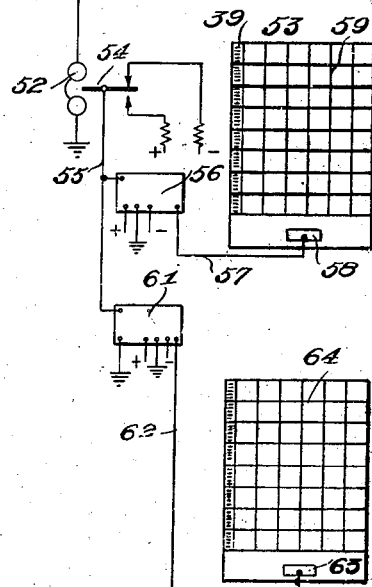
INVENTOR.
Louis M. Potts
BY
Strauch & Hoffman
ATTORNEYS

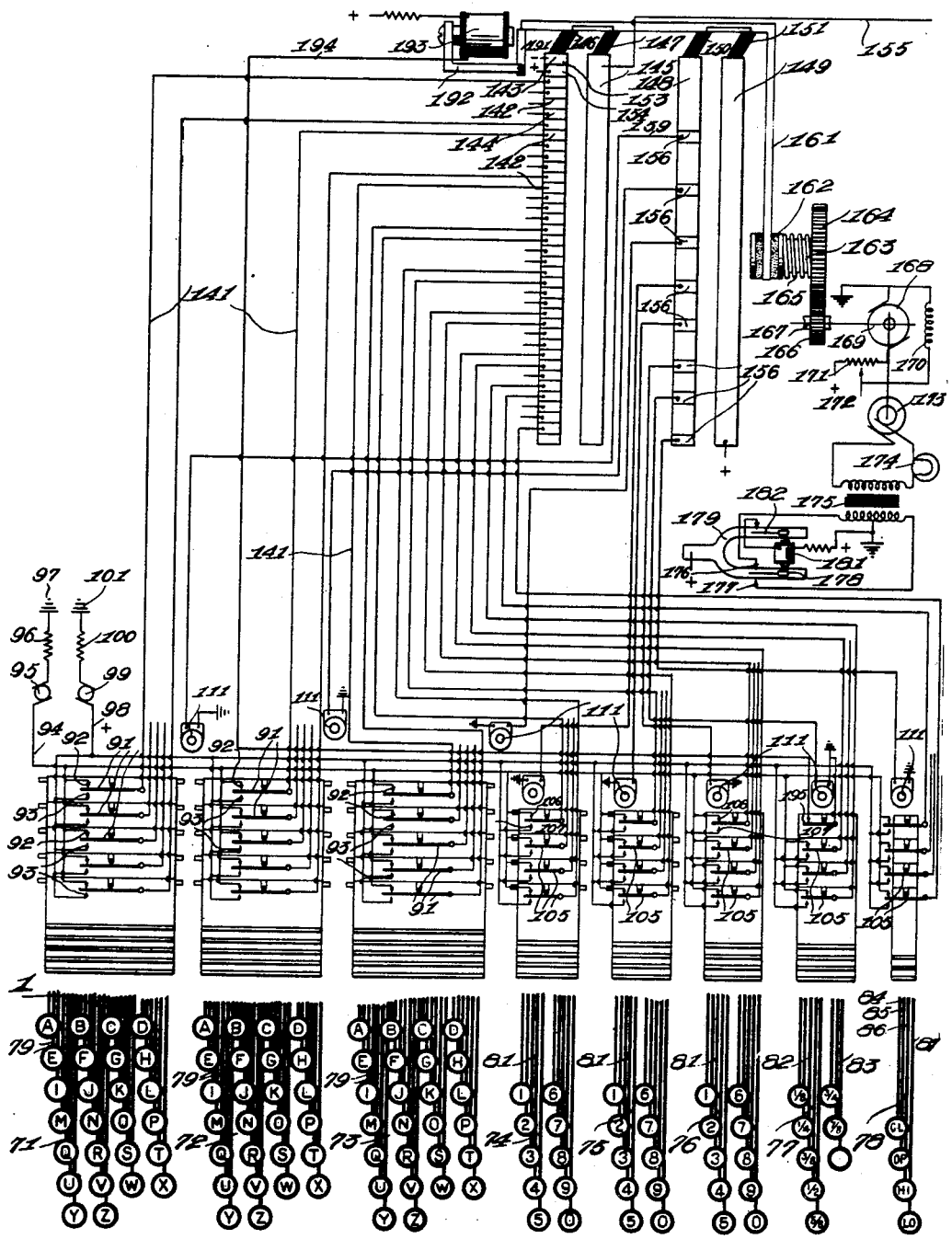

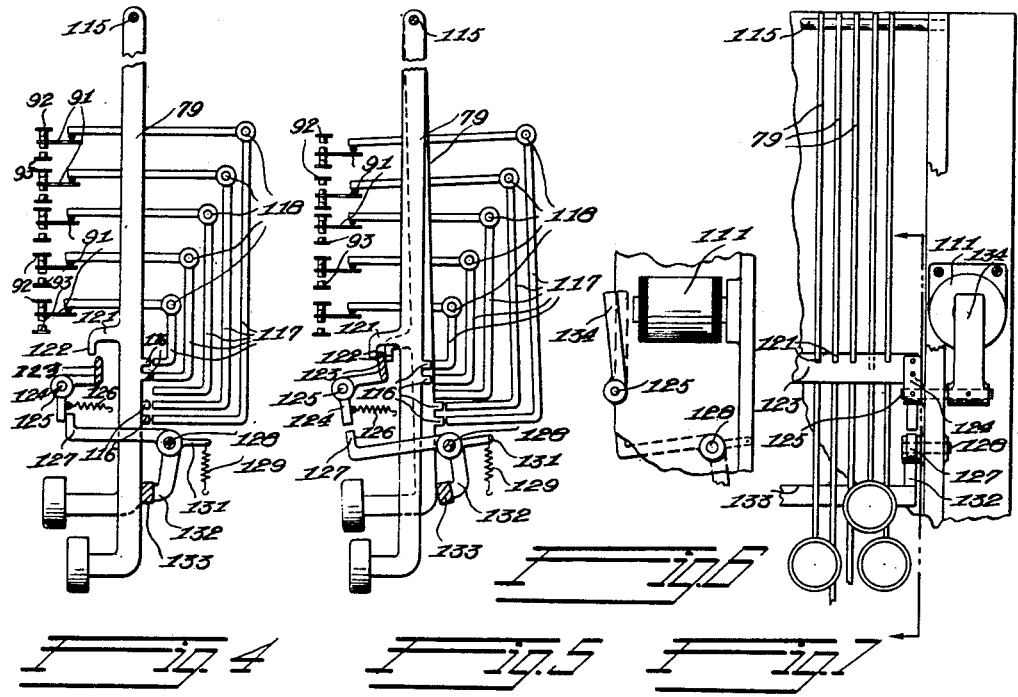

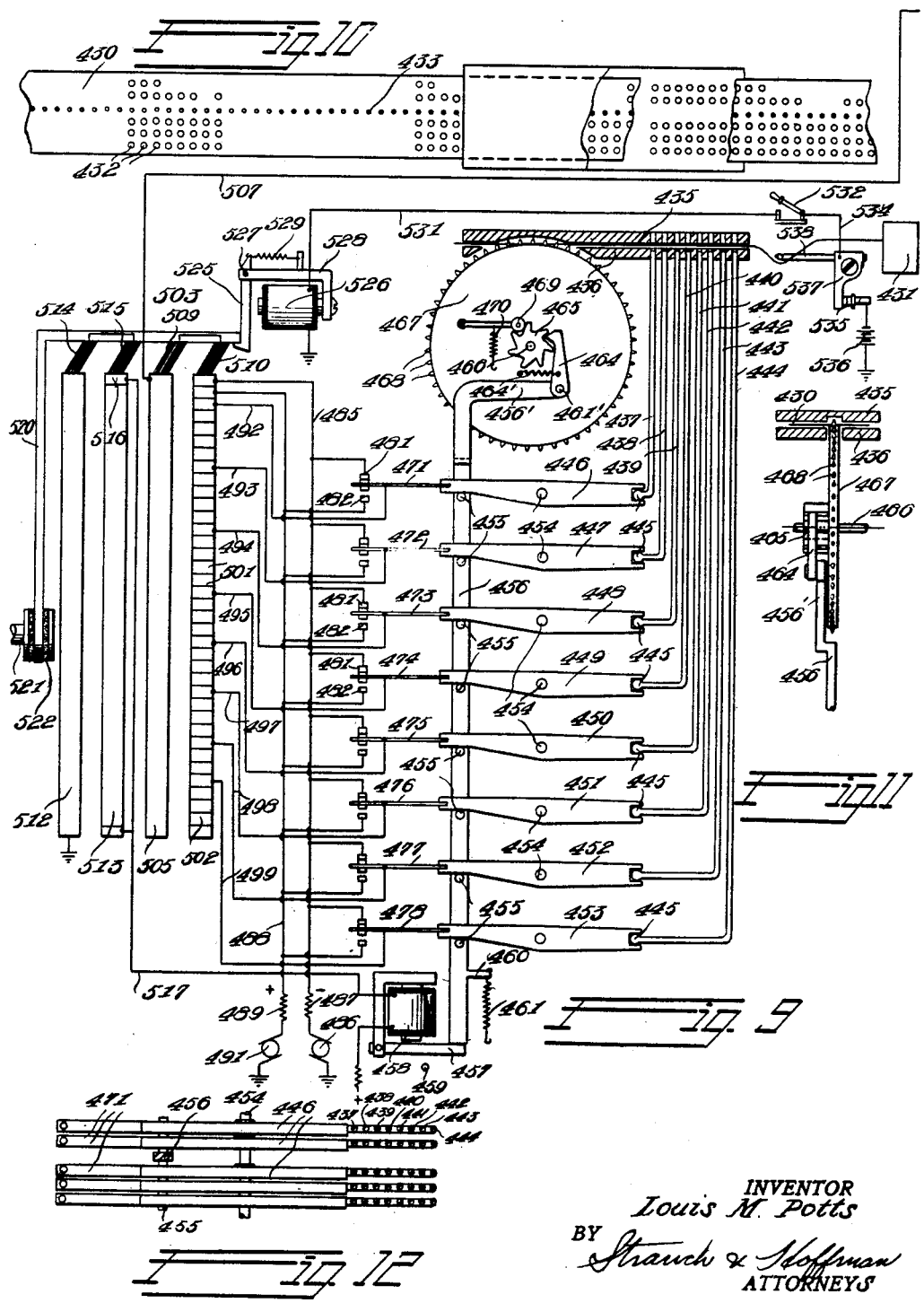

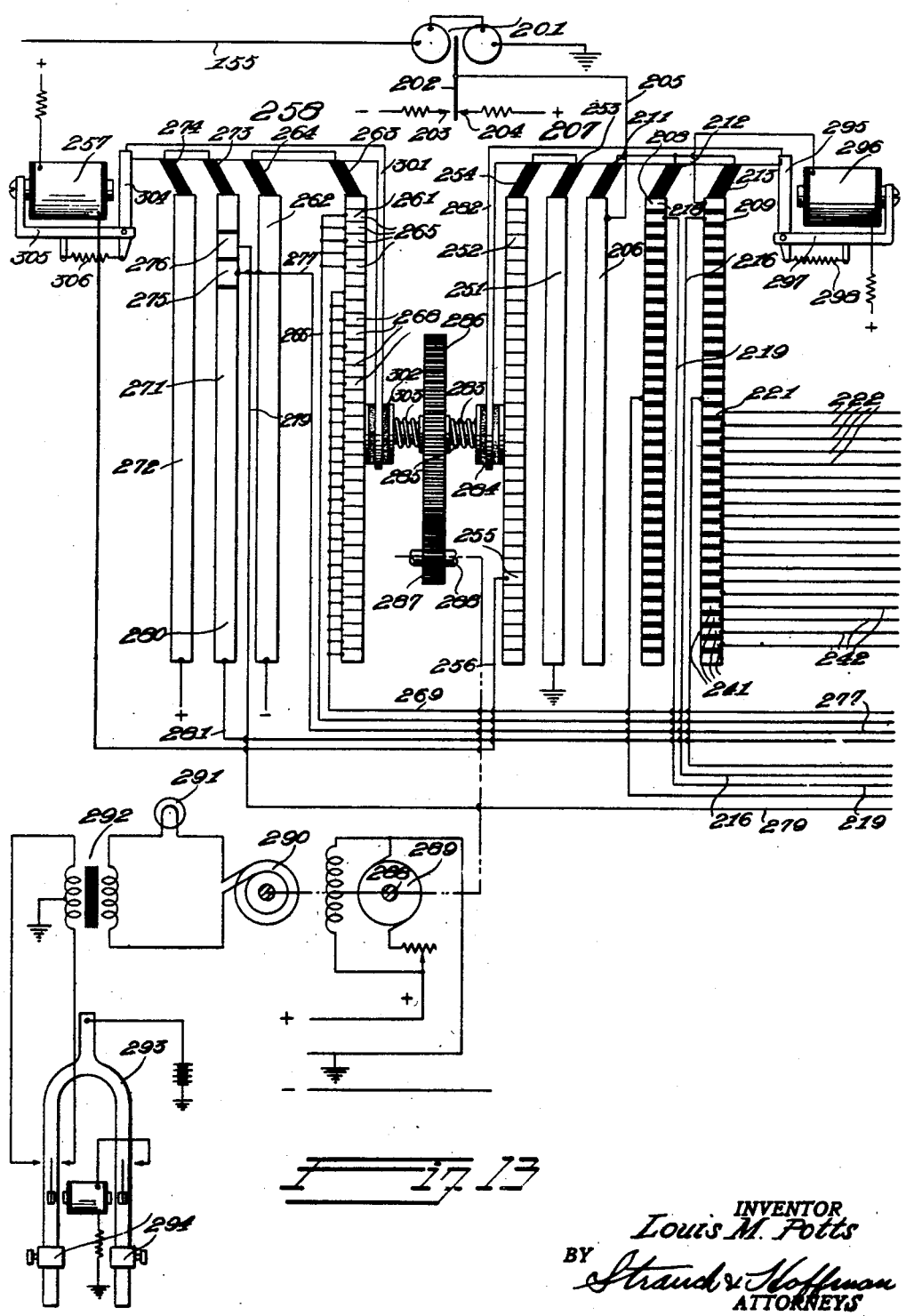

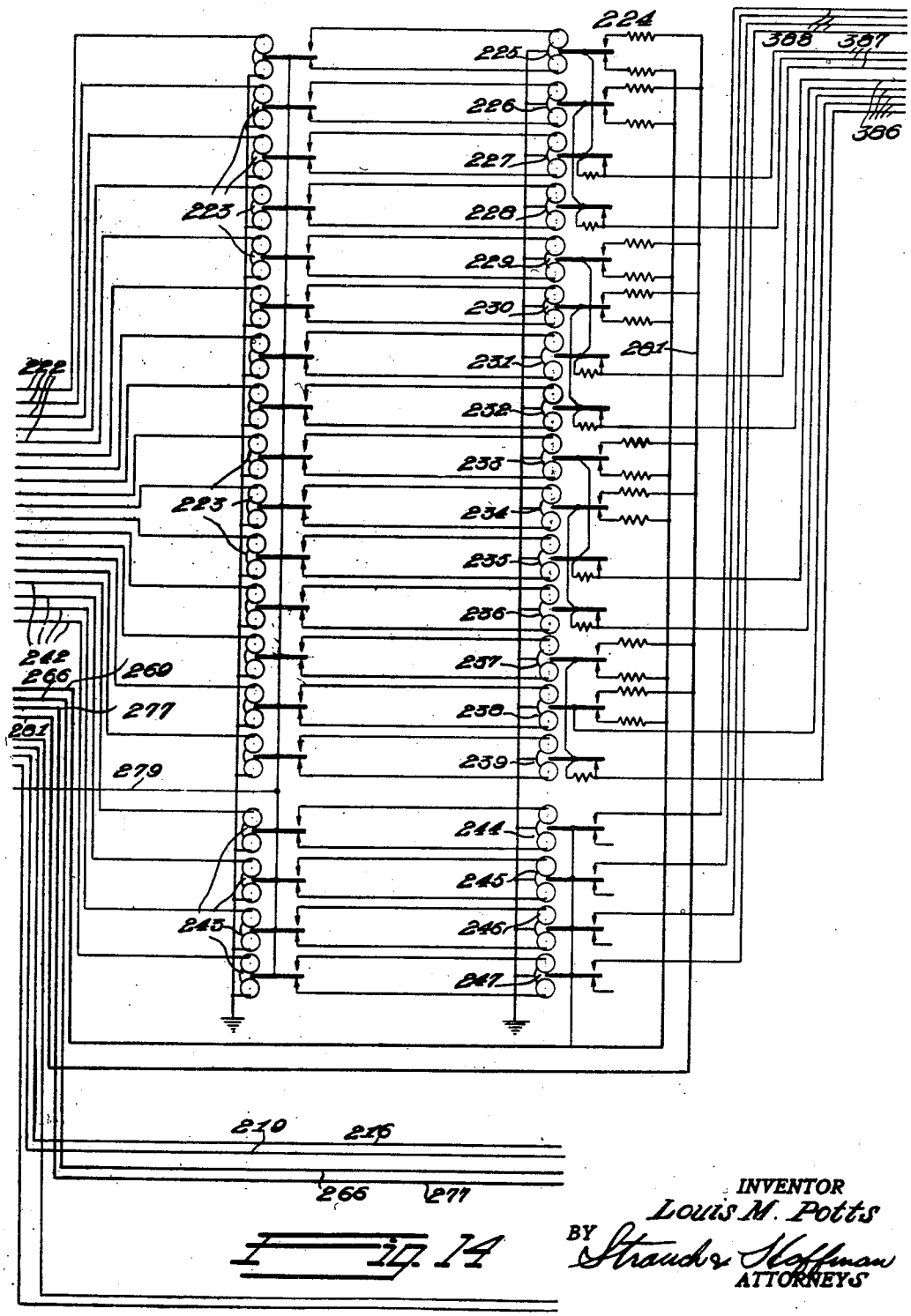

May 8, 1945.   L. M. POTTS   2,375,383
SELECTIVE SIGNALING SYSTEM
Filed Jan. 17, 1929   15 Sheets—Sheet 7
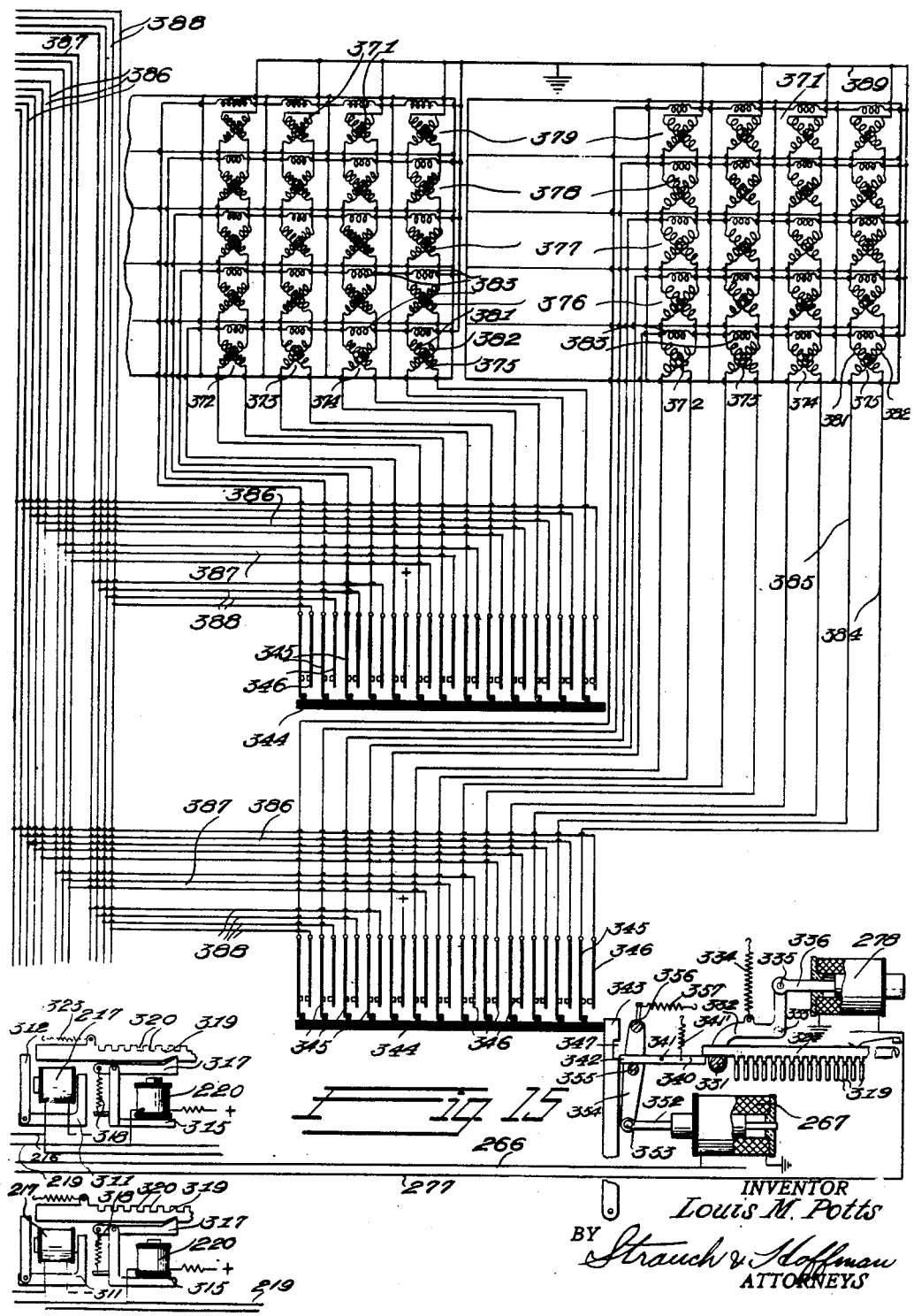
INVENTOR
Louis M. Potts
BY Strauch & Hoffman
ATTORNEYS May 8, 1945.　　　　L. M. POTTS　　　　2,375,383
SELECTIVE SIGNALING SYSTEM
Filed Jan. 17, 1929　　　15 Sheets-Sheet 8
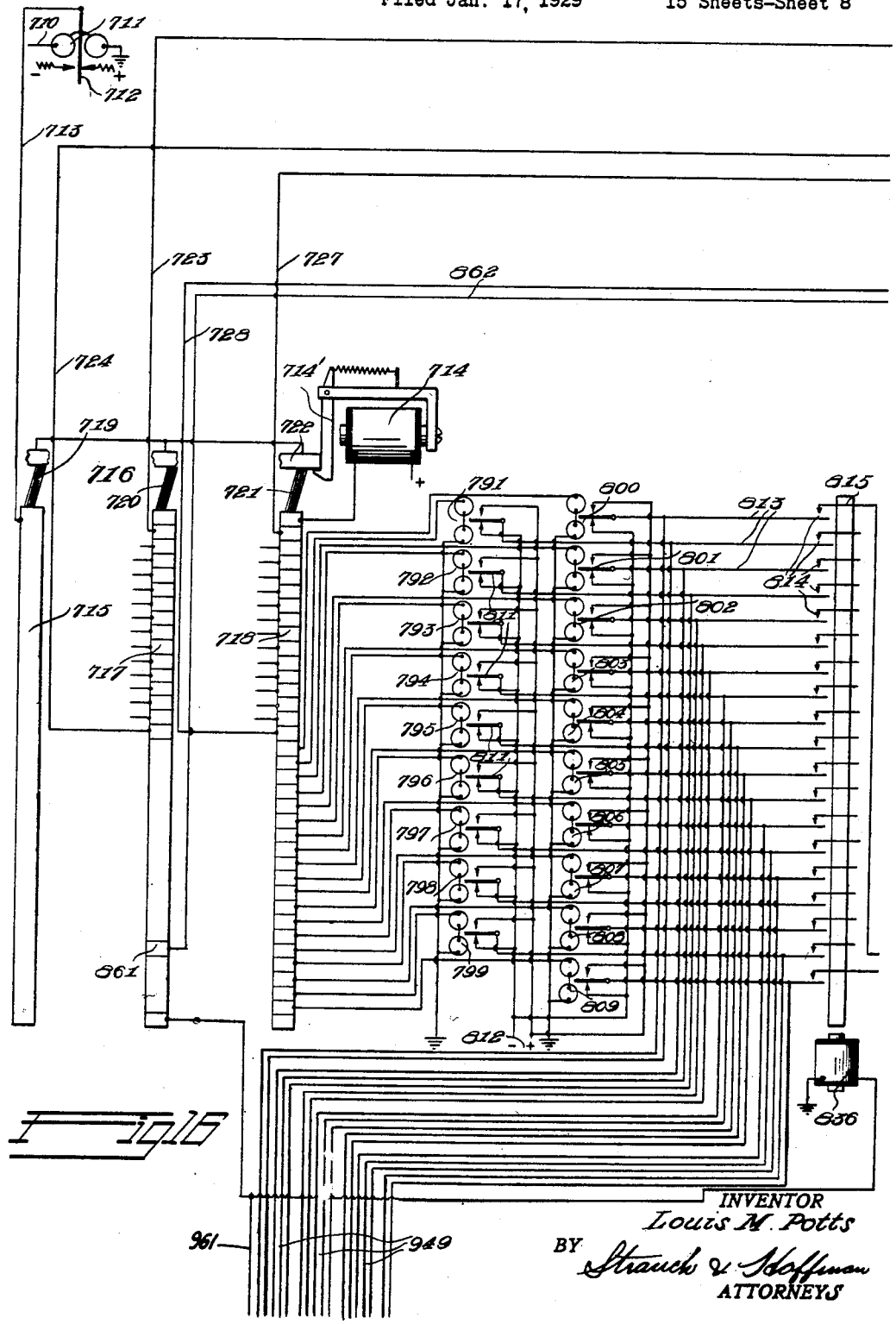
INVENTOR
Louis M. Potts
BY Strauch & Hoffman
ATTORNEYS

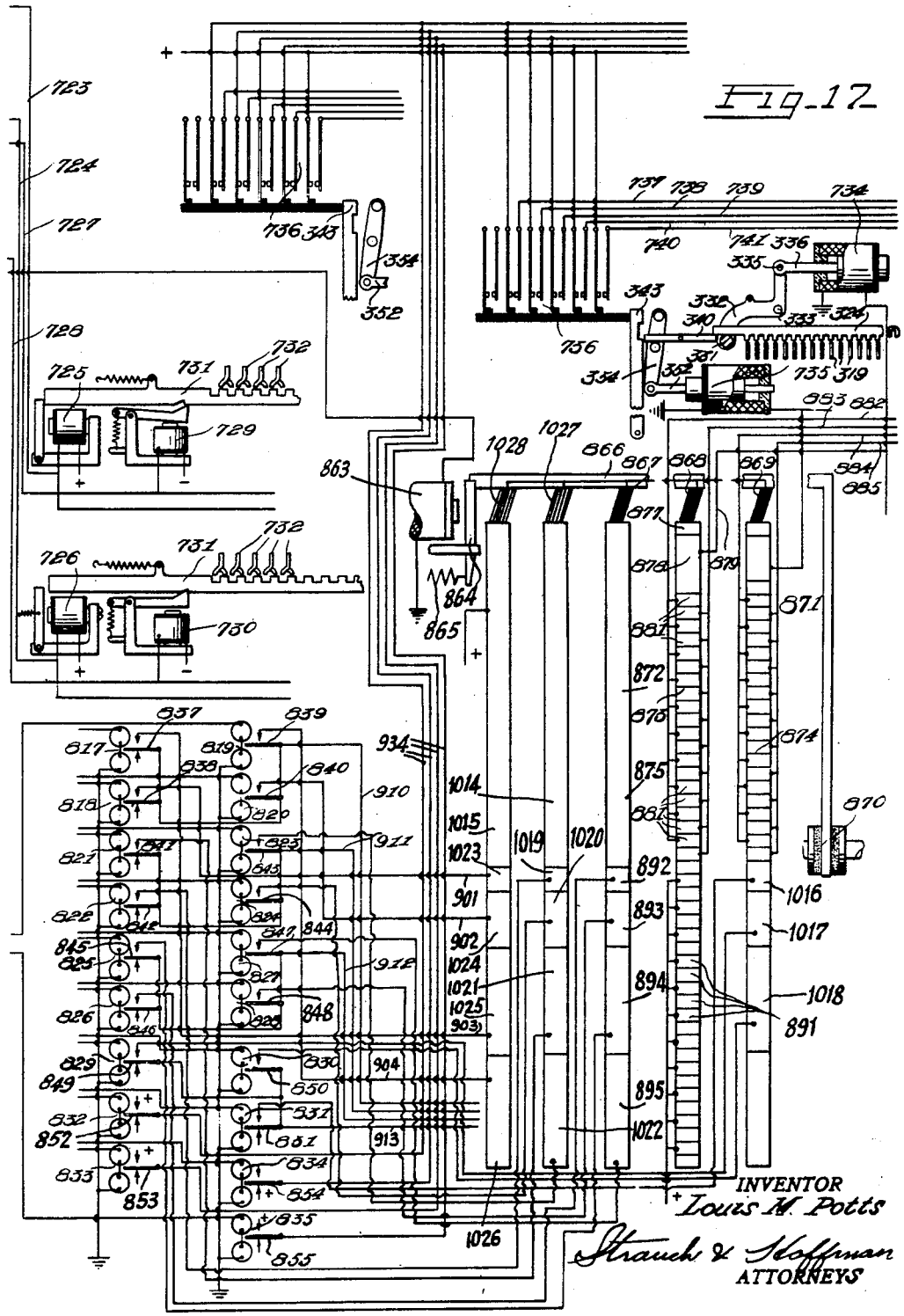

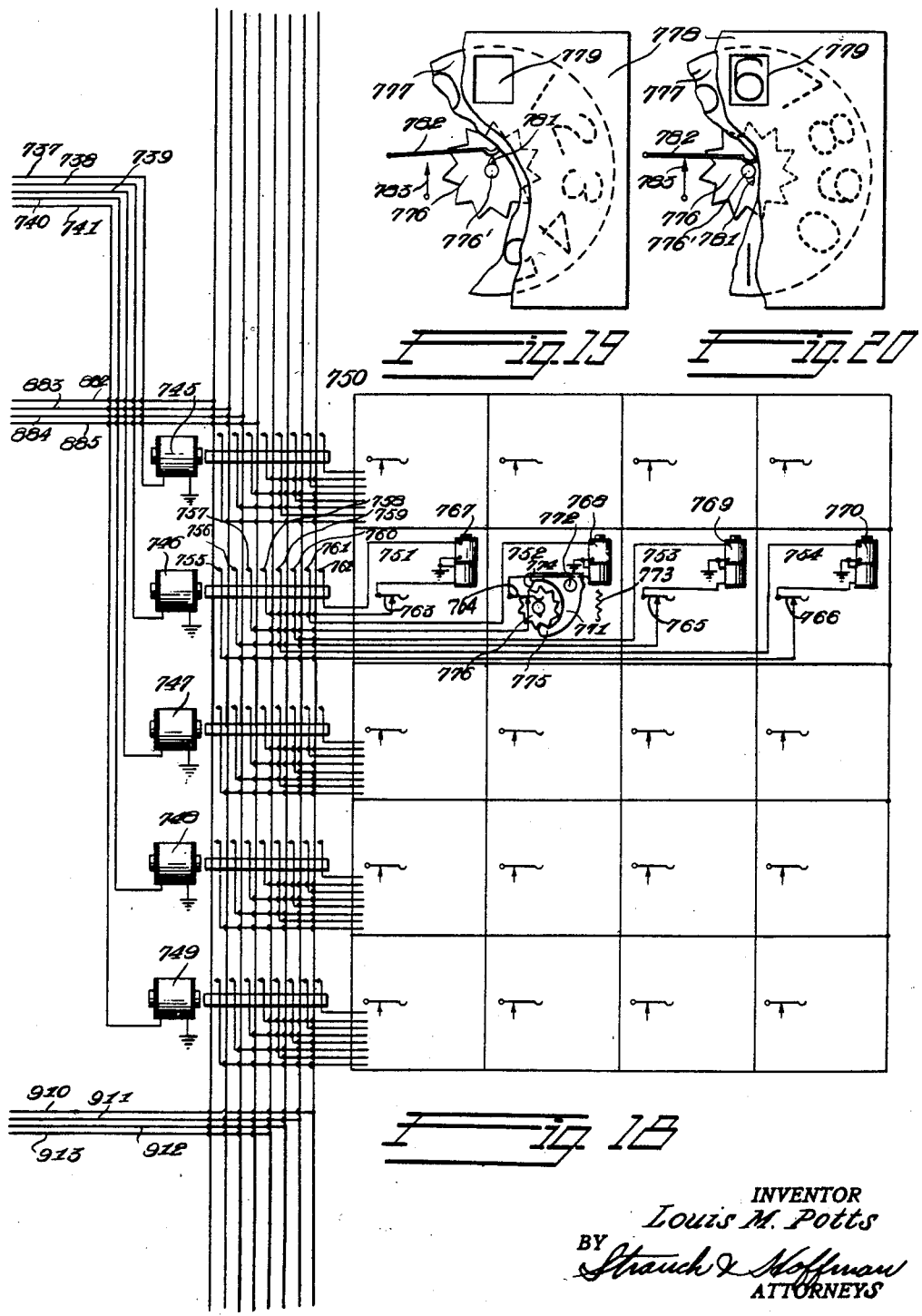

May 8, 1945.  L. M. POTTS  2,375,383
SELECTIVE SIGNALING SYSTEM
Filed Jan. 17, 1929  15 Sheets—Sheet 11
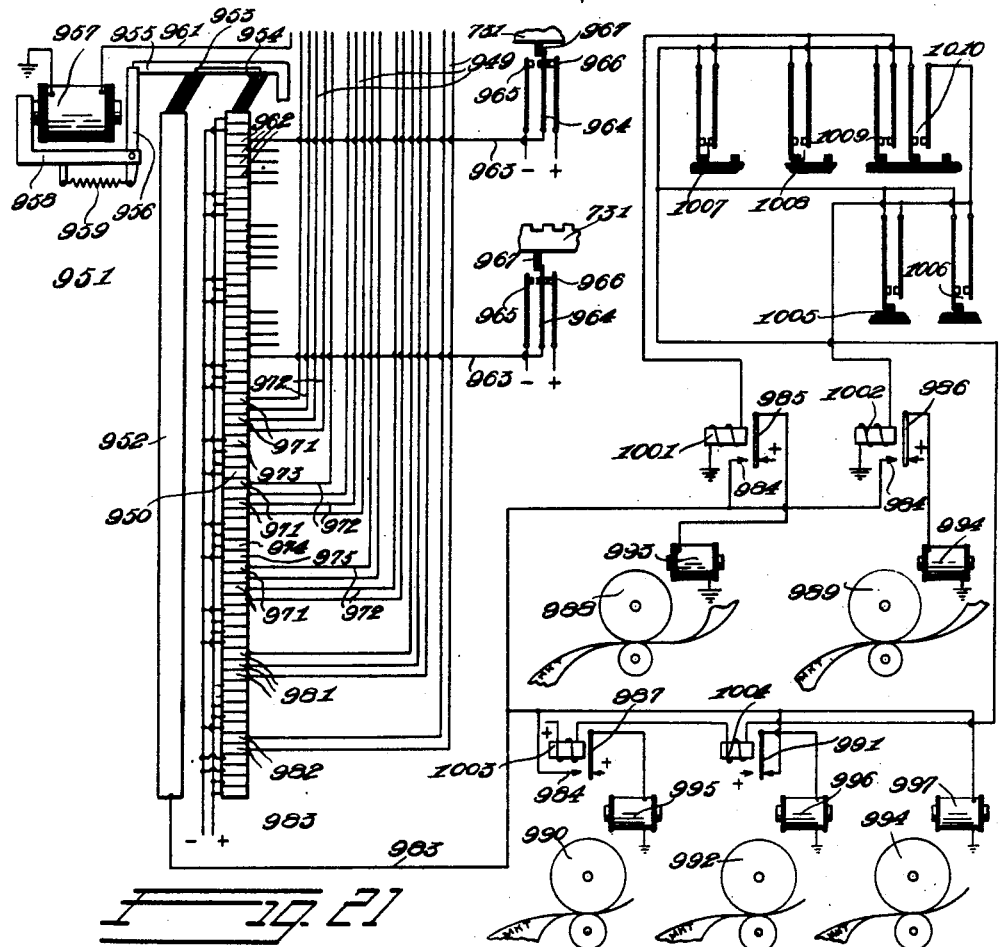
INVENTOR.
Louis M. Potts
BY
Strauch & Hoffman
ATTORNEYS May 8, 1945. L. M. POTTS 2,375,383
SELECTIVE SIGNALING SYSTEM
Filed Jan. 17, 1929 15 Sheets-Sheet 12
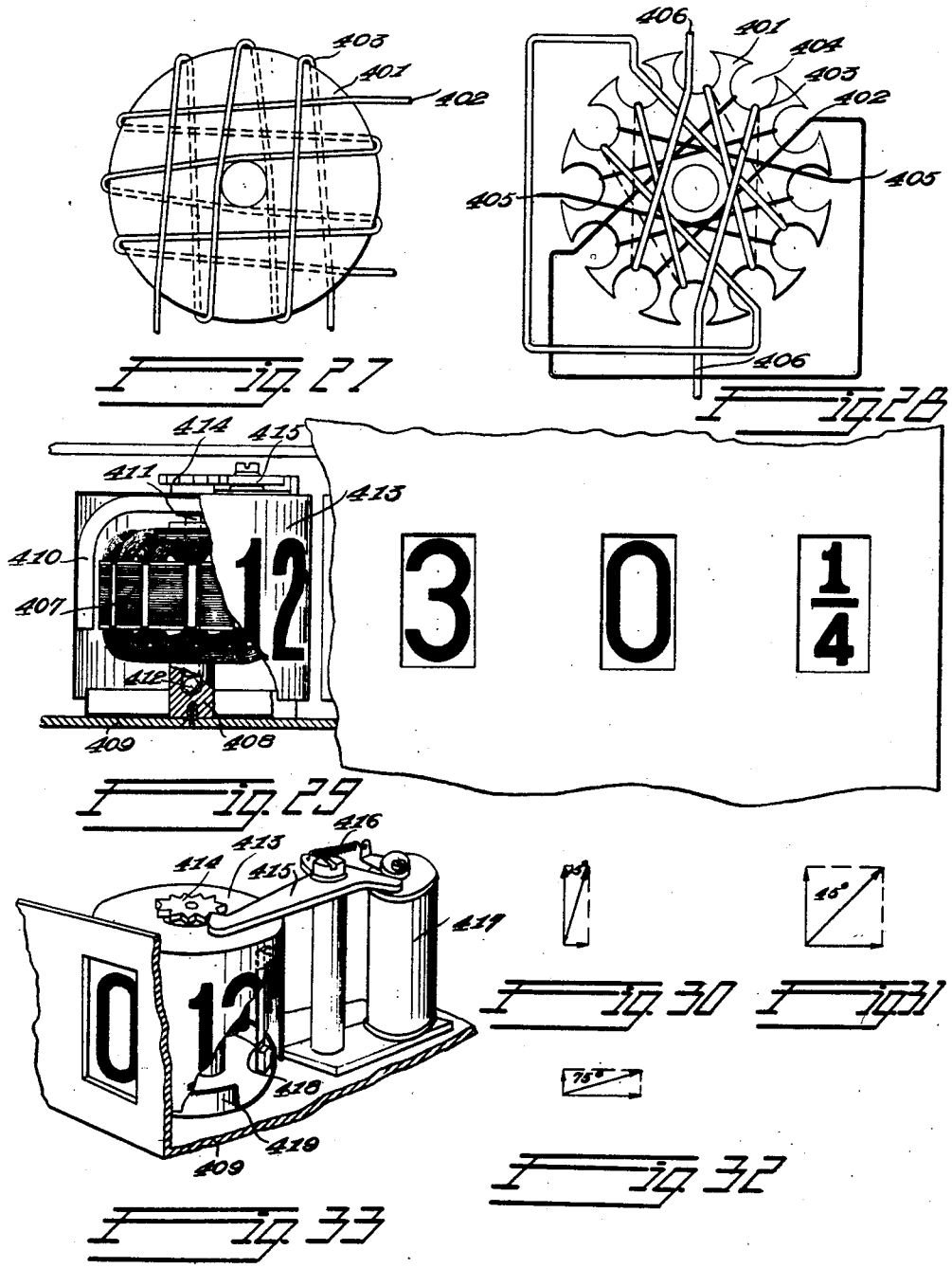
INVENTOR
Louis M. Potts
BY Strauch & Hoffman
ATTORNEYS May 8, 1945.　　　　L. M. POTTS　　　　2,375,383
SELECTIVE SIGNALING SYSTEM
Filed Jan. 17, 1929　　　　15 Sheets-Sheet 13
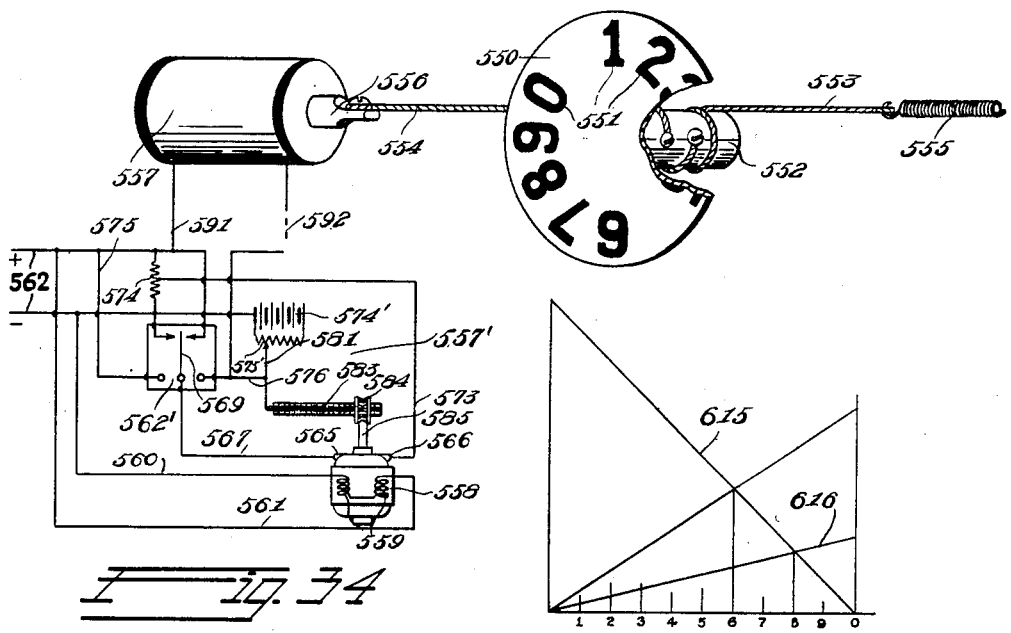
_Fig. 34_
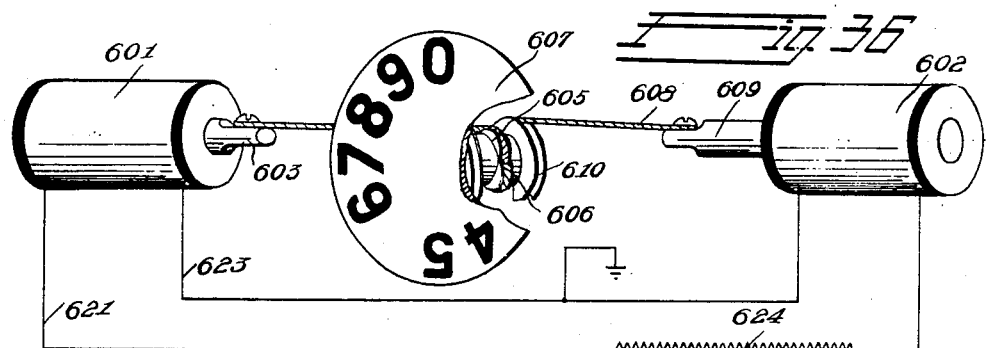
_Fig. 36_
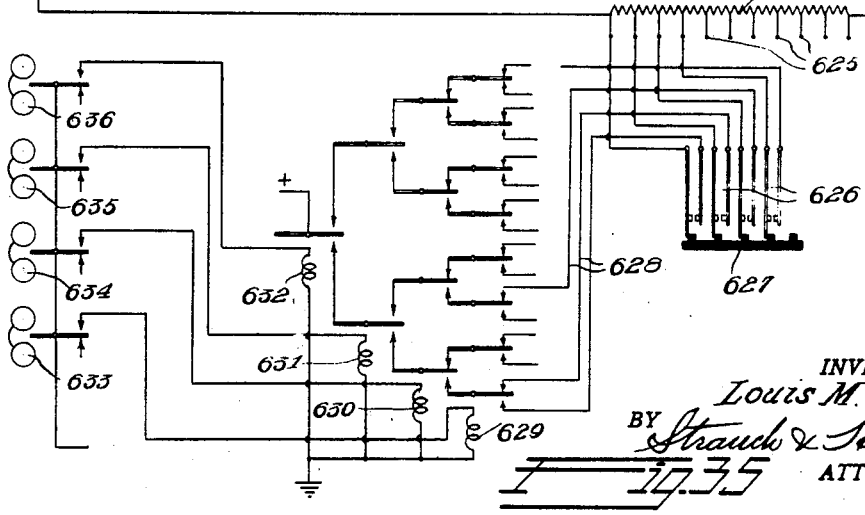
_Fig. 35_
INVENTOR
Louis M. Potts
BY Strauch & Hoffman
ATTORNEYS May 8, 1945.　　　L. M. POTTS　　　2,375,383
SELECTIVE SIGNALING SYSTEM
Filed Jan. 17, 1929　　　15 Sheets-Sheet 14
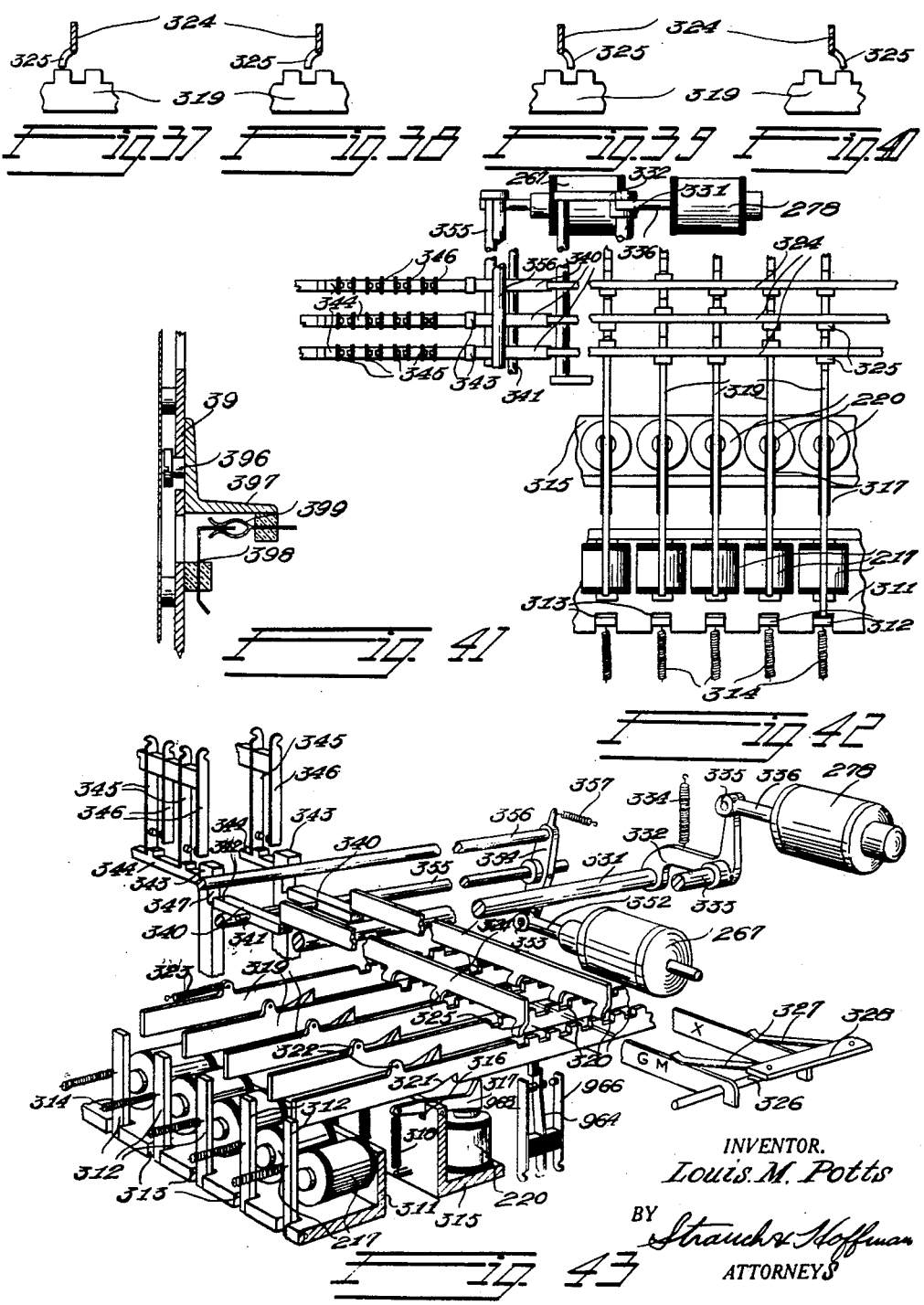
INVENTOR.
Louis M. Potts
BY Strauch & Hoffman
ATTORNEYS May 8, 1945.    L. M. POTTS    2,375,383
SELECTIVE SIGNALING SYSTEM
Filed Jan. 17, 1929    15 Sheets-Sheet 15
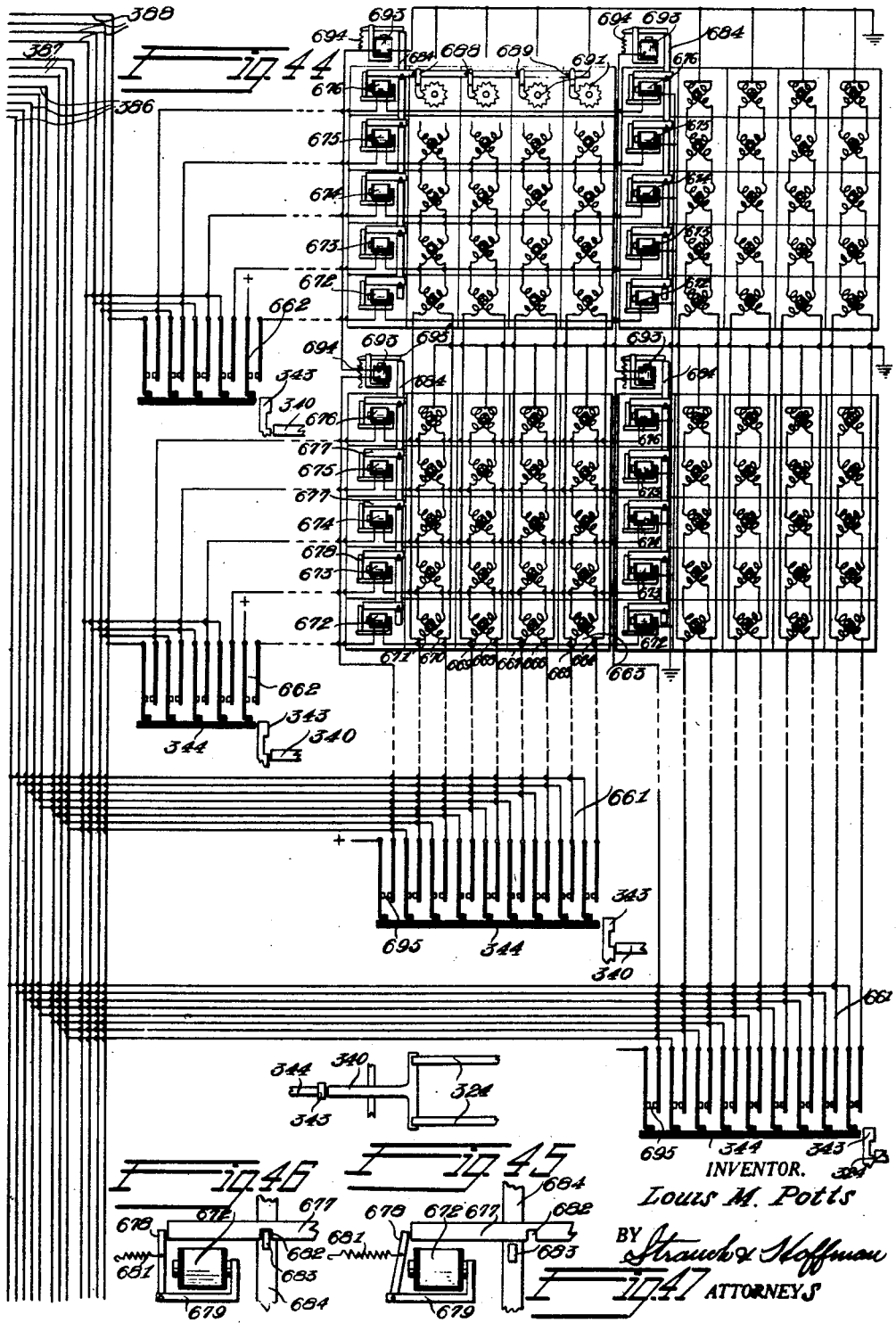

Patented May 8, 1945

2,375,383

UNITED STATES PATENT OFFICE 2,375,383

SELECTIVE SIGNALING SYSTEM

Louis M. Potts, Evanston, Ill., assignor to Teletype Corporation, Chicago, Ill., a corporation of Delaware Application January 17, 1929, Serial No. 333,161

49 Claims. (Cl. 177—353)

This invention relates to selective signaling systems, and is particularly adapted to the selective control of remotely disposed stock and commodities quotation boards from a central dispatching station, although the various combinations, sub-combinations and elements are not limited to such uses.

The recent development of high speed tickers, has rendered the arrangement heretofore in use in which the quotations received from the transmitting station are posted manually by attendants impractical and entirely inadequate to keep pace with the increased volume of business now being transacted. To handle this large volume of business, automatic means are necessary which indicate the quotations just as the quotations are received, independently of any manual operation by an attendant.

Accordingly, a primary object of the invention is to provide a selective signaling system for indicating quotations at a plurality of remote stations under control of a central dispatching station which is simple, reliable and accurate.

Another object of the invention is to provide methods and apparatus for performing remote control, distributing, indicating and like operations adapted to the remote automatic indication and recording of stock quotations and other selective control uses.

A further object of the invention is to provide novel indicating and recording methods and apparatus.

Still another object of the invention is to provide novel circuit arrangements to selectively operate a plurality of indicators individual to items to be indicated.

A still further object of the invention is to provide novel synchronizing means for selective and automatic remote control systems.

Further objects of the invention are to provide novel transmitting, selecting, and receiving equipment in telegraph systems, and which are especially adapted for automatic distribution of stock and like quotations.

Other objects of the invention are such as will be attained by utilization of the combinations and sub-combinations as set forth hereinafter in the various independent relations to which they are applicable, and as defined by the appended claims.

In the drawings:

Fig. 1 is a schematic outline of one embodiment of the improved remote control as applied to a stock quotation distribution system.

Fig. 2 is a front view of one embodiment of a single stock indicating unit.

Fig. 3 is a circuit diagram of the transmitter and key board mechanism for use in the preferred embodiment of the invention.

Fig. 4 is a detail view of an improved key board showing a lock therefor in the normal position.

Fig. 5 is a detail view of the key board shown in Fig. 4 with the lock shown in the released position.

Fig. 6 is a detailed view of the restoring mechanism for the lock on said key board.

Fig. 7 is a fragmentary top view of said key board.

Fig. 8 is a diagrammatic view illustrating codes employed in the preferred embodiment of the invention.

Figure 9 is a diagrammatic view of an automatic tape transmitter and the transmitting circuit therefor for use in a modified form of the invention.

Figure 10 is a partial top view of said automatic tape transmitter showing the perforated tape.

Figure 11 is a detailed view of the tape feed mechanism for said tape transmitter.

Figure 12 is a detailed view of a single group of control levers employed in said tape transmitter.

Figure 13 is a schematic view of a receiving distributor utilized with the invention.

Figure 14 is a circuit diagram of the translating relays in a preferred form of receiving circuit for the invention.

Figure 15 is a circuit diagram of a stock selector and also of a form of indicator control circuit for use in the invention.

Figure 16 is a circuit diagram of receiver including the receiving distributor for step by step indicators utilized in a modified form of the invention.

Figure 17 shows a circuit diagram of the translating circuits for step by step indicators.

Figure 18 shows the circuit diagram for the step by step indicators.

Figures 19 and 20 are fragmentary views showing the preferred forms of step by step type indicators for the invention.

Figure 21 is a circuit diagram of selectively operated stock tickers for use in the stock quotation system.

Figure 22 is a fragmentary view of the tape with records on it made by a selected stock ticker.

Figure 23 is an arrangement of the sheets of drawings showing a complete key board system.

Figure 24 is an arrangement of the sheets of drawings showing a complete automatic tape system.

Figure 25 is an arrangement of the sheets of drawings showing a complete sending and receiving circuit with step by step indicators, key board transmission and circuit for selectively operated recording printers.

Figure 26 is an arrangement of sheets of drawings showing complete sending and receiving circuit with direct key board transmission and coordinate operation of cross magnetic indicators.

Figure 27 is a schematic diagram showing principles of a modified form of indicator of the cross magnetic type for use in the system.

Figure 28 is a showing of the field windings for the cross magnetic indicators shown in Figure 27.

Figure 29 is a broken view of the cross magnetic indicator.

Figures 30, 31 and 32 are diagrams showing the directions of the resultant field in the cross magnetic indicator shown in Figure 27.

Figure 33 is a perspective view of the cross magnetic indicator showing a lock mechanism.

Figure 34 shows a volt meter modified type of indicator with voltage regulator which may be used in the system.

Figure 35 shows a further modification of the indicator employing a double solenoid with an operating circuit.

Figure 36 is a diagram showing the pull at various points in the solenoids of the indicator shown in Figure 35.

Figures 37 to 40 show the detail mechanism for operating the selector bars in the preferred form of the invention.

Figure 41 shows the detail of the mounting for a stock unit.

Figure 42 is a fragmentary plan view of the preferred form of stock selectors.

Figure 43 is a perspective view of the stock selectors shown in Figure 42.

Figure 44 is a coordinate selector for cross magnetic indicators.

Figure 45 shows details of the latch for the selector shown in Figure 44 and

Figures 46 and 47 show details of the lock for the cross magnetic indicator shown in Figure 44.

General description of system

A preferred embodiment of the system employed in carrying out the invention is disclosed in Figure 1 in which a transmitter 1, for generating code combinations of impulses is electrically connected over the conductor 2 to a series of transmitting or repeating relays 3 to 7, provided with individual armatures 8 to 12 respectively operating between individual pairs of contacts 13 and 14. Although, as shown, polar relays are employed, it will be understood that these relays may be of any preferred construction.

Contacts 13 are all multipled over the conductor 15 and extend through resistance 16 to the negative side of a source of energy 17 which is grounded at 18. The contacts 14 are similarly multipled and connected over conductor 19 through the resistance 20 to the positive side of a source of power 21 grounded at 22. The resistances 16 and 20 prevent excessive flow of current over these conductors in the event of any short circuit or other trouble on the signaling line.

Each of the armatures 8 to 12 is connected to an individual signaling line such as lines 23 and 24 each of which extends to a receiving set as will be described hereinafter. These receiving sets may be remotely disposed with respect to the transmitter station or at some adjacent point, this depending on the desired location of the stock quotation boards to be operated.

It will be clear from the above description that those armatures 8 to 12 which are in engagement with their upper contacts 13 complete circuits from the negative side of the source of energy 17 to their individual signaling lines and those armatures in engagement with their lower contacts 14 complete circuits from the positive side of the source of energy 21. In the present case, this source of energy is shown as two direct current generators, although it is understood that any other well known source of energy as for example a storage battery may be utilized and that the connection may be made to either side of the battery with a grounded tap at the center as is well known in the signaling art.

When the transmitter shown diagrammatically at 1 is operated, each of the transmitting relays 3 to 7 will be operated in accordance therewith for operating their armatures between contacts 13 and 14. A code is accordingly transmitted by each of these transmitting relays. Thus, for example, as the armature 8 is successively operated, in accordance with the code generated by transmitter 1, contacts 13 and 14 will variably associate the sources of negative and positive energy 17 and 21 to the line 23 with which the armature 8 is associated and accordingly code combinations of impulses will be transmitted thereover. Similarly transmitting relay 7 will operate its armature 12 to transmit the same code over signaling line 24.

The line 23 extends to a plurality of receiver and distributor mechanisms 27 to 29 located at a station 31, which station either may be local with respect to the transmitter 1 or at some point remote therefrom. In the present instance, these distributors are assumed to be local and accordingly no repeater is interposed between the line 23 and distributors 27 to 29. The receiving mechanisms 27, 28 and 29 diagrammatically shown are, as will be described hereinafter, arranged to receive the code combinations of impulses transmitted over the line 23 and distribute them to selecting mechanisms. Although these distributors are shown connected in series, it will be understood that a parallel connection may be used if desired. As shown, the distributor 27 is connected over the conductor 32 to selector mechanisms 33, 34, and 35. Each of the selector mechanisms 33 to 35 is individual to a stock quotation board section 36, 37 and 38 respectively. In the present embodiment, these stock quotation sections are shown made up of 48 stock units or items 39, six being arranged horizontally and eight vertically in each unit. Each of these units 39 represents an item, the quotation of which is to be indicated and as will be described in detail hereinafter, comprises indicators made up of numerals.

As will be described in more detail hereinafter, the impulses distributed by the receiver and distributor 27 selectively operate the selector mechanism 33 which in accordance with the received code selects one of the units 39 for operating the indicators thereon. As will be understood by those skilled in the art, the selector 33 is arranged to operate in response to those codes for making the necessary selections in the section 36, whereas the selector 34 will operate in response to different codes to make the selection of the units in section 37 and so on. Thus although all of the selectors 33 to 35 will operate in response to the signals received over the line 23 through the receiver and distributor 27, only one of these will be effective in response to any one code for making a selection in this particular section.

In addition to operating the indicators in sections 36 to 38 the receiver and distributor 27 is also connected over the conductor 41 to the selector 42 individual to the section 43. As will be clear from the above in each of the sub-stations there may be one or more sections of quotation boards 36 to 38 and 43 each of which comprises any desired number of stock units or items. It will be understood that any number of boards may be employed, some provided with a larger number of units and others with a smaller number of units and still others comprising only a single unit. Any combination of items may be placed on each of the boards by merely arranging the selector in accordance therewith as will be described in more detail hereinafter.

As shown in Figure 1, the receiver and distributor 27 is also connected over the conductor 45 to a printing magnet 46 which controls a printing mechanism 47 of any well known type for printing on a tape 48. As will be clear, the magnet 46 is operated selectively in accordance with a code transmitted over the conductor 45 from the receiver and distributor 27 to record the stock quotations which are indicated on the stock quotation board.

Similarly each of the other receivers and distributors 28 and 29 connected in series with distributor 27 operate in response to codes received over line 23 for operating indicators and printers connected thereto as shown in connection with distributor 27.

It will be clear from the above that the other relays 4 to 7 similarly operated under control of the transmitter 1, may be connected through their armatures 9 to 12 over individual conductors to remote points where similar receivers and distributors are located for distributing the impulses to selectors operating similar stock quotation indicators. Thus for example, the armature 12 of the transmitter relay 7 is shown connected over the conductor 24 to the receiving and repeating relay 52 at a remote station 53. Armature 54 of relay 52 operating between its upper and lower contacts connected to the negative and positive side of a source of power, is connected over conductor 55 to a distributor 56 similar to distributor 27 located at station 31. A conductor 57 is shown connected to the distributor 56 and to a selector mechanism 58 associated with the stock quotation section 59 for selecting the indicators 39 thereon in accordance with the code received by the distributor 56. A second distributor 61 in parallel with distributor 56 over line 55 is connected over conductor 62 to a selector 63 for operating the indicators 39 in a section 64.

In the above description, a general diagrammatic circuit diagram of the system is described none of the details of the mechanism being specifically shown. As will now be clear, the transmitting arrangement, with the relays 3 to 7 and the generators 17 and 21, are located at the principal office or master station which might be in the telegraph office or in the stock exchange itself. From this station, there radiate a number of conductors such as 23 and 24, the former of which may extend to receiving equipment 27 to 29 located in the same city as the master station 1.

The receiving apparatus 27 may control any number of boards, a large board with a great many sections 36 to 38 and a small board with few sections 43, the latter possibly for use of a specialist. There may be also operated from the receiving apparatus 27, stock tickers for printing the quotations of any stock or selected list of stocks, which feature of the invention has been made the subject matter of divisional application Serial No. 663,483, filed March 30, 1933, which matured into Patent No. 2,225,657, granted December 24, 1940.

The conductor 24 may extend to a distant city where a similar series of broker's offices may have boards which are controlled from the central office 1. Any sort of network may be built up in this manner covering the entire country so that all the boards and selective tickers for a given exchange may be operated from a single transmitting point.

One method contemplated for operating such a system, is to have one or more editing operators who will use a standard ticker tape, designating the "high" "low," etc. This tape will then be passed to the sending operator or operators, who will transmit the designations indicated. It will probably be desirable or essential for this operation and for monitoring purposes, to provide the complete board in the central office for the guidance of the editing operators.

*Transmitter*

A detailed description of the transmitter key board, relay, transmitter distributors, selector and item indicators making up one complete circuit of this system will now be given.

The key board mechanism 1, Figure 3, comprises eight sets of key board sections 71 to 78. Key board sections 71 to 73 each comprise a complete set of standard telegraph typewriter key levers 79, one for each letter of the alphabet. Key board sections 74 to 76 each comprise ten key levers 81 one for each of the ten digits from 0 to 9. The key board section 77 comprises seven key levers 82 one for each of the fractions from 1/8 to 7/8 and an extra blank key lever 83 for the start operation as will be described more fully hereinafter, and the key board section 78 comprises four key levers 84 to 87 one each for closing, opening, high and low respectively.

These key board sections may be of any well known construction in which the levers operate contacts in various combinations in the manner shown in the patent to Potts 1,299,608 issued April 8, 1919, or the patent to Kleinschmidt, 1,567,392 issued December 29, 1925, for generating code combinations of impulses although it will be understood that these are cited as illustration and that any other transmitter such as the keyboards used for call indicators in automatic telephone exchanges may be utilized if preferred.

In the illustrated embodiment the key levers 79 on key board 71 selectively operate five contactors 91 between contacts 92 and 93 in various combinations. As described in the patents referred to above, each key lever 79 will operate these contactors in individual combinations.

Contacts 92 are connected in multiple over conductor 94 to the negative side of the source of energy 95 and through a resistance 96 to ground at 97. Contacts 93 are connected in multiple over a conductor 98 to the positive side of the source of energy 99 connected through a resistance 100 to ground at 101. As shown in the drawings, the key levers on the second and third key boards 72 and 73 control five similar contactors 91 operating between contacts 92 and 93. These are operated in the well known manner in various combinations in accordance with the particular key lever depressed for closing various combinations of circuits from the sources of energy 95 and 99 to a distributing mechanism to be later described.

The levers 81 on the fourth key board 74 comprising the ten digits, selectively control four contactors 105 operating between contacts 106 and 107. These contacts are connected in multiple and to the sources of power 95 and 99. Upon depression of any one of the key levers 81 in the key bank 74, combinations of four of these contacts are closed and as is well known in the art provide sixteen different combinations of impulses in accordance with the key levers depressed. Inasmuch as there are ten key levers in this bank, it will be clear that the number of code combinations available are in excess to that necessary. The same is true of the key banks 75 and 76. The key bank 77 similarly controls combinations of three contactors for providing the necessary seven codes for the fractions and key levers 84 to 87, each control one contactor 105.

Associated with the banks of keys 71 to 78 are unlocking magnets 111 one individual to each of the banks. Upon operation of a key lever 79 in the bank 71 a locking mechanism, to be described, operates to lock the operated key in position and lock the remaining levers on the bank against operation. The magnet 111 associated with the bank operates immediately after the transmission of the code controlled by the operated key for releasing the operated key from its operated position and releasing the other levers to permit operation of any one thereof. This arrangement prevents the operation of more than one key during the transmission of an individual code signal.

The details of this latching mechanism are disclosed in Figures 4 to 7 to which reference will now be had. As shown each of the key levers 79 is pivotally mounted on a pin 115, and is provided with downwardly projecting lugs 116 on the under surface thereof. As will be understood by those skilled in the art, various combinations of these lugs are provided on each key lever, these lugs coacting with levers 117 pivoted on pins 118 and operating the contact closers such as 91 between their contacts 92 and 93. In response to the operation of key lever 79 shown in Figure 4, two of these lever arms 117 are operated to in turn operate the contact closers 91 associated with them from contact 92 with which they are normally associated to their opposite contacts 93. Similarly each of the other key levers operate individual combinations of the levers 117.

Extending upwardly from each of the key levers 79 is a curved lug member 121 provided with a horizontal section 122. As shown in Figure 4 the horizontal section 122 extends a distance insufficient to normally engage universal member 123 of a locking lever 124 when all the key levers 79 are in unoperated position. Lever 124 is pivoted on pin 125 suitably mounted on the frame work of the key board and has secured thereto one end of a spring 126 the other end of which is secured to the frame work. The universal member 123 extends adjacent all of the lugs 121 on the levers 79.

Spring 126 normally maintains the lever 124 in engagement with the latching lever 127, pivotedly mounted on the pin 128 suitably carried in the frame and is normally urged into engagement with the locking lever 124 by the spring 129, one end of which is secured to the extension 131 of the locking lever 127 and the other end to the frame work. The locking lever 127 is provided with an extension 132 on which is carried a universal member 133 extending beneath all of the key levers 79.

Under normal conditions with all of the key levers in a non-operated position, the spring 129 maintains the universal member 133 in engagement with the lower sides of all of the key levers 79. In that position the latching lever 127 is in engagement with the lever 124 and acts against the tension of spring 126 to maintain the universal member 123 just out of engagement with the horizontal extension 122 of the lug 121 of each of the key levers 79. Upon the operation of any one of these key levers, the universal member 133 is pushed downwardly as shown in Figure 5 and the locking lever 127 is rocked against the tension of spring 129 until it disengages the lever 124. The spring 126 thereupon rocks the lever arm 124 about its pivot 125 moving the universal member 123 to the position shown in Figure 5 in operative relation with the horizontal extension 122 of each of the lugs 121 on the key levers 79. These non-operated levers 79 are now locked against operation by the universal member 123 and the operated lever is locked in position.

As shown in Figures 6 and 7 restoring or unlocking magnet 111 is provided with an armature 134 rotatable with pin 125 on which it is mounted. Upon energization of the restoring magnet 111 in a manner to be described, its armature 134 is rocked to in turn rotate pin 125. Latching lever 124 is thereby rotated in a clockwise direction restoring it to its normal non-operated condition, in turn restoring the operated key lever and conditioning the other key levers for operation.

Referring again to Figure 3, it will be noted that each of the contact controllers 91 is connected over conductors such as 141 individual thereto to individual segments 142 on the distributor 143. Distributor 143 comprises a first section composed of a segmental ring 144 and a solid ring 145 bridged by brushes 146 and 147 and a second section comprising a segmental ring 148 and a solid ring 149 bridged by the brushes 150 and 151.

The first segment 153 on ring 144 connected to the negative side of a battery is a stop segment and the second segment 154 connected to the positive side of a battery is a start segment. The next fifteen segments on ring 144 are connected to the fifteen contact controllers 91 on the first three key banks 71 to 73, the succeeding twelve segments are connected to the contact controllers 105 of the key banks 74 to 76, the next three segments are connected to the contact controllers on the key bank 77 and the next four segments are connected to the contact controllers on the key bank 78. The lowermost segment on ring 144 cooperates with the start and stop segments 153 and 154 as will be described in connection with the completed systems. The solid ring 145 is connected to a signaling line 155 extending to a receiving apparatus for transmitting the code combinations generated by key boards 71 to 78 thereto.

By this arrangement for each cycle of operation of this giant start-stop distributor, there is transmitted three letter characters, three numbers, a fraction, and a control signal. It will be noted that the same combination of impulses may be used for a letter, for a number and for a fraction, and instead of determining which character is desired by a shift signal, this is determined by the position of the combination with respect to the start impulse.

The ring 148 is provided with eight segments 156. Each of these segments 156 is so positioned with respect to the preceding five segments on the segmental ring 144 that the brushes 150 and 151 pass thereover when in rotation, immediately after the brushes 146 and 147 have moved over these five segments. The first segment 156 is connected over the conductor 159 to the electro magnet 111 associated with the first bank of keys 71. Similarly each of the other segments on ring 148 is connected to the associated magnets 111. The solid ring 149 is connected to the positive side of a source of energy. When the brush 150 wipes over the segment 156 a circuit is completed through the electro magnet 111 indicated which upon energization restores the latching mechanism as described in connection with Figures 4 to 7 for permitting the restoration of the key levers.

Due to the large number of segments on the distributor and the character of the signaling, some form of associate speed control in addition to the start-stop feature is needed as the synchronism for this type of distributor must be considerably more accurate than is required for the usual five or six unit code start-stop distributor. Such a control will now be described. The brushes 146, 147, 150 and 151 are carried on arm 161 in operative relation with the friction clutch 162 of any well known construction. The friction clutch 162 is carried by and rotatable with the driving shaft 163 which also carries a gear 164 secured in a well known manner for rotation with the shaft. A spring 165 presses the friction clutch 162 against the arm 161 providing a mechanical friction clutch connection to the drive shaft 163. The gear 164 meshes with the pinion 166 carried on the drive shaft 167 of a direct current motor 168 comprising an armature 169 and field winding 170 connected at one terminal through a resistance 171 to the positive side of a source of energy 172 and at the other terminal to ground. Upon the same shaft with the armature 169 is an alternating current motor 173 which is connected through the lamp 174 to the secondary of a transformer 175.

The primary of this transformer is connected to two contacts 176 and 177 of a leaf spring 178 mounted on one of the tines of a tuning fork 179. The tuning fork 179 of any well known construction is connected to the positive side of a source of power. The circuit for an electromagnet 181 is alternately closed through a contact controlled by the leaf spring 182 mounted on the other tine of the tuning fork 179. When the tines are spread apart, the circuit for the electromagnet 181 is closed from positive battery through fork 179, through contact 182 (which is now closed), through winding of magnet 181 and thence through resistance to ground, and this magnet thus is energized to bring the fork tines together. In the spread position, current flows through contact 177 and the right hand half of the primary of transformer 175 to ground. With the tines of the fork close together, the leaf spring 178 closes the contact 176 and completes a circuit through the other half of the primary winding and in the opposite direction. In this manner periodical reversals of current are produced in the primary of transformer 175 which in turn induces alternating currents of a predetermined frequency in the secondary of the transformer which flows through the alternating current motor 173.

As is well known in the art, the tines of the tuning fork 179 can be made to vibrate at a predetermined frequency and are then kept vibrating at this frequency by the electromagnet 181. Accordingly currents of a fixed frequency flow through the winding of motor 173. The winding of motor 173 of any well known construction produces rotation, as is well known, at a speed determined by the frequency of the current flowing therethrough. This frequency control system is more clearly described in U. S. Patent No. 1,764,316 and is illustrated in Figure 1 of that publication. In this manner the motor 168 is kept rotating at an almost constant speed, the actual power for driving the shaft 167 being supplied by the motor winding 168. Accordingly an almost constant rotating speed for the distributor 143 is obtained. The flickering of the lamp 174 observed in connection with the rotation of the distributor will in a well known manner, determine the relative speed at which the motor is rotating.

As shown, the arm 161 is normally latched against rotation by a latching armature 191 pivotally mounted on the frame 192 of the electromagnet 193. When the electromagnet 193 is energized in a manner to be described, it moves armature 191 from engagement with the arm 161 and releases the latter for rotation. The electromagnet 193 is connected over the conductor 194 to a contact controller 195 on the key bank 77. This contact is as described above, arranged to be closed upon the operation of any one of the key levers 82 or blank lever 83 on bank 77.

The operation of the key board transmitter will now be described. In order to transmit a quotation of a particular item, the operator first depresses a key bar on each of the first three key banks 71 to 73 for transmitting a code to select the indicator individual to the particular item for which the quotation is to be transmitted. As will be described hereinafter this code when received at the receiving station will select the indicator individual to the particular item desired. The operator will also depress one of the key bars on each of the banks 74 to 76 which will transmit codes individual to the digits making up the quotation for the selected item. One of the levers 82 on the bank 77 will also be operated to transmit a code for the fraction in the quotation and a key lever on bank 78 will be operated to transmit a code indicating whether the quotation is close, opening, high, low or last. As has been described in detail above, upon the depression of any key lever in banks 71 to 78 the other key levers in each of these banks are locked from operation and the depressed key levers are locked in operated position.

Depression of any key lever 82 closes the contact 195. It will be understood that the blank lever 83 need only be depressed in the event that a fraction code is not to be sent. Inasmuch as the closing of contact 195 starts the distributor, the key on this bank should be the last one operated. As a result of the closing of contact 195 a circuit is completed from ground through the contact 195 and over conductor 194 through the winding of electromagnet 193 and to the positive side of a battery. The electromagnet 193 upon energization operates its armature 191 releasing the arm 161 for rotation. The arm 161 is thereupon driven by the motor 168 through the meshing gears 166 and 164 and through the friction clutch 162. With the brushes resting on the stop segment 153, current from the negative side of the source of energy connected to this segment flows over the line 155. As the brushes 146 and 147 move to the next or start segment 154, positive battery is connected to the line 155 from segment 154, brushes 146 and 147 and ring 145. As will be described hereinafter, this current will function to release a distributor located at the receiving end of line 155 which is similar to the distributor described above.

As the brushes 146 and 147 rotate over the first five segments 142, a code is impressed upon the signaling line 155 in accordance with the positions of the contact controllers 91 operated by the depression of a key lever 79 on the bank 71, the impulses being transmitted from the source of energy 95 or 99 in the well known manner. As the brushes 146 and 147 move over the next five segments a similar code is transmitted in accordance with the contact controllers operated on the bank 72 and the same is repeated during the next five segments in accordance with the contact controllers operated on bank 73. These three code combinations of five impulses, each comprising, in the arrangement shown, negative and positive impulses select an indicator individual to an item at the receiving station as will be described hereinafter. As the brushes 146 and 147 wipe over the next four segments, a code is transmitted comprising a combination of four impulses individual to a digit which in turn will operate the selected indicator at the receiving station to indicate the unit digit. The same occurs during the next two groups of four segments, the codes transmitted being determined in accordance with the contacts operated on the key banks 75 and 76 and operating the selector indicator to display the tens and hundreds digits of the quotation. During the next movement of the brushes over the next three segments, codes of three impulses individual to a fraction value is transmitted. As the brushes 146 and 147 wipe over the next four contacts, a signal is transmitted in accordance with the depression of a key lever on the bank 78 to indicate the type of quotation which has been transmitted.

Rotating with the brushes 146 and 147 are the brushes 150 and 151. As described above, when the brush 150 engages the segment 156, a circuit is completed for the electromagnet 111 associated with bank 71, the circuit extending from ground through the winding of electromagnet 111 and through the segment 156, brushes 150 and 151 to ring 149 and positive side of battery. This circuit, it will be noted is completed immediately after the code generated on bank 71 has been transmitted by segmental ring 144, the segment 156 being positioned so that brushes 150 and 151 do not wipe thereover until brushes 146 and 147 have wiped over the first five code segments in ring 144.

Upon energization of the magnet 111, the locking mechanism 124, Figures 4 and 5, is rocked about its shaft to release the locked operated key bar on bank 71 and also condition the other non-operated key bars for operation. The operator is thus able to operate another one of these keys for the next quotation to be sent without waiting until all of the characters for the preceding quotation have been sent.

It will be clear from the above description that the apparatus at the transmitting station is normally in a non-operated condition and that upon the operation of key levers in banks 71 to 78 including the key lever 83 on bank 77, the distributor 143 is released to make a single revolution during which time the codes, as described above, are successively transmitted over conductor 155.

*Receiver*

The manner in which the various item indicators are selected at the receiving end of the line 155 in accordance with the codes transmitted and then operated to indicate the quotations of the item will now be given, in connection with Figure 13 and Figures 37 to 43.

Connected in the signaling line 155 is a line receiving relay 201, Figure 13, responsive to the impulses transmitted over the line 155. Relay 201 is provided with an armature 202 operating between two contacts 203 and 204 connected, respectively, to the negative and positive sides of a source of energy. Armature 202 is connected over a signaling line 205 to a solid ring 206 of a distributor 207.

The distributor 207, in addition to the ring 206 as described above, is provided with a first and second segmental ring 208 and 209 both of which are bridged with the solid ring 206 by brushes 211, 212 and 213. The first segments on rings 208 and 209 are stop segments on which the brushes are normally held at rest. The next fifteen segments of ring 209 are connected over conductors such as 216 to marking impulse selector magnets 217 (Figure 15) the opposite terminals of which are connected to the negative side of battery. Similarly, the corresponding fifteen segments on ring 208 are connected over conductors 219 to spacing selector magnets 220, the opposite terminals of which are connected to the positive side of battery. A similar pair of magnets, it will be understood, is connected to each of the other next fourteen segments on each of the rings 208 and 209. In response to a marking impulse, the marking magnet connected to the segment of ring 208 over which the brush 212 is at that instant rotating is energized, and if a spacing signal is received, the spacing magnet connected to segment on ring 209 over which the brush 213 is at that instant rotating is energized.

The succeeding fifteen segments 221 on the distributor ring 209 are connected over conductors such as 222 to receiving relays 223, Fig. 14. The receiving relays in turn control the energizing circuits for group of relays 224 comprising relays 225 to 239 which, as will be described hereinafter, are arranged in pairs to control the direction and intensity of current flow through associated indicators by means of the resistance elements.

The next four segments 241 on the segmental ring 209 are connected over conductors 242 to the receiving relays 243 which, in turn, control the circuits for the group of relays 244 to 247, Fig. 14, the operations of which will be described more fully hereinafter.

The distributor 207 comprises, in addition to the rings described above, a solid grounded ring 251 and a segmental ring 252 bridged by brushes 253 and 254. A segment 255 located near the lower end of the segmental ring 252 is connected over a conductor 256 to a magnet 257 which controls the rotation of a second distributor 258.

The distributor 258 comprises a segmental ring 261 and a solid ring 262 bridged by two brushes 263 and 264. The segments 265 on the segmental ring 263 are connected in multiple to the conductor 266 which completes a circuit for a restoring magnet 267, Fig. 15, which, as will be described, restores the previously set up selection of an item in preparation for the selection in accordance with the new code. The segments 268 are multipled over conductor 269 for completing the final indicator circuits, conditioned by the operation of relays 225 to 239, in accordance with the received code combination as will be described more fully hereinafter.

In addition to the two rings described above the distributor 258 comprises two rings 271 and 272 bridged by brushes 273 and 274. The ring 272 is continuous and is connected to the positive side of battery. Ring 271 comprises segments 275 and 276. Segment 275 is connected over the conductor 277 to the operating magnet 278, Fig. 15, which as will be described in detail hereinafter releases a selected selector bar individual to a set of item indicators. The segment 276 is connected over the conductor 279 which completes circuits for operating relays 225 to 247 in accordance with the operation of relays 223 and 243. As will appear more fully hereinafter, this provides an overlap between the receiver relays and item indicator's operation. The ring 271 also has a large sector portion 280 connected over a conductor 281 to the armatures of relays 225 to 239 and which cooperates with segments 268 and conductor 269 for completing the circuits for variably operating the selected indicators.

It will be noted that both the distributors 207 and 258 are normally latched against rotation. In the case of the distributor 207, the brushes 211, 212, 213, 253 and 254 are carried by an arm 282 which is freely mounted on shaft 283. A friction clutch 284 carried by and rotatable with the shaft 283 transmits power therefrom to drive the arm 282, by pressure supplied by spring 285 which forces the clutch 284 against arm 282. The shaft 283 is driven by a gear 286 mounted thereon which meshes with gear 287. Gear 287 is mounted on and rotatable with the power drive shaft 288 connected to the rotating member of a motor drive 289 as diagrammatically indicated by the broken line. It will be noted that the motor mechanism and synchronizing is similar to that described in detail in connection with the transmitter, the mechanism comprising the alternating current motor winding 290, lamp 291, transformer 292 and a tuning fork 293. Vibrations of the tuning fork periodically reverse the direction of current flow in the transformer 292, which in turn through its secondary impresses this alternating current of a fixed frequency on the alternating current motor 290 which is thus rotated at a fixed constant frequency to maintain motor 289 at the proper speed. The tuning fork 293, it will be noted is provided with weights 294 which are adjustable along the tines of the tuning fork. In practice, these are adjusted after the fork has been set in vibration, until the receiving distributor described above is in synchronism with the transmitting distributor. This is a well known method of starting and accordingly is not disclosed in detail.

By means of power supplied by motor 289, the arm 282 carrying the brushes of distributor 207 tends to rotate. Normally however, arm 282 is prevented from rotating by armature 295 of start magnet 296 which is electrically connected to the first segment on ring 209. Armature 295 is pivoted to the frame 297 of the magnet 296 and is normally held in retracted position by spring 298 one end of which is secured to the armature 295 and the other to the frame 297. With the armature in retracted position, it is in the path of arm 282 and locks the latter from rotation. As will be described, the start impulse received over line 155 energizes magnet 296 to release arm 282 for rotation.

Similarly the brushes 263, 264, 273 and 274 of distributor 258 are carried on an arm 301 which is driven by motor 289 through a friction clutch 302 with which it is forced into operative engagement by spring 303. The arm 301 is normally latched against rotation by armature 304 pivotally mounted on the magnet framework 305 of magnet 257 and normally held in retracted position by spring 306. As in the case of armature 295, the armature 304 when in retracted position is in the path of arm 301 and therefore prevents the latter from rotating. Magnet 257 is energized over a circuit including conductor 256 to release arm 301.

The operations of the selector magnets will now be given in connection with Figures 37 to 40, 42, 43. From the foregoing, it will be clear that there are fifteen pairs of selector magnets 217 and 220, each associated pair being connected to oppositely disposed segments on rings 208 and 209. Only five such marking magnets 217 and only one of the spacing magnets 220 are shown in Figure 43 for convenience.

The group of marking magnets 217 are mounted on a frame work 311 on which are pivotally carried armatures 312 arranged in slots 313 and normally held in non-operated retracted position by individual springs 314 one end of which is secured to the armature and the other end to the frame work. The spacing selector magnets 220 are similarly mounted on a frame work 315 on which are pivotally mounted in slots 316, armatures 317 individual to the magnets 220 and normally held in retracted non-operated position by individual springs 318 one end of which is secured to a projection on the frame 315 and the other end to the armature 317.

In operative relation with each pair of magnets 217 and 220 is a code bar 319 each having a series of equally spaced slots 320 in its upper surface and a V-shaped notch 321 in its lower surface engaged when the code bar is in operated position, by a tooth of the armature 317 of its individual selector magnet 220. Each of the selector bars 319 is also provided with an upwardly extending lug 322 to which one end of a spring 323 is secured. The other end of the spring is secured to the frame work in any suitable manner and normally urges its individual bar 319 to the left and against the armatures 312 of its individual marking magnet 217.

In response to a marking impulse energizing a marking magnet 217, armature 312 moves to the right forcing the associated bar 319 to the right against the action of its spring 323 until the notch 321 is positioned over the tooth of armature 317 which is thereupon forced upwardly by its spring 318 into the notch 321, thereby locking the bar 319 in operated position. If during the succeeding code, a marking impulse is received for this same magnet, the impulse will operate its armature but inasmuch as the permutation bar is in its operated position it will have no effect. If on the other hand, the impulse for this magnet in the succeeding code is for a spacing impulse, the magnet 220 will energize and remove the tooth of its armature 317 from engagement with the notch and the permutation bar will be returned to its spacing position by its associated spring 323. In this manner all of the permutation bars 319 are selectively operated in accordance with the received code.

Positioned just above the permutation bars 319, at right angles thereto, are a series of selector bars 324, each provided with a series of equally spaced lugs 325 which are associated with a permutation bar 319. As shown in Figures 37 to 40 these lugs are bent either to the right or left of the plane of the bar, according to whether the impulse corresponding to the permutation bar associated with the lug is spacing or marking. If the impulse is spacing for the signal corresponding to the particular bar, the corresponding lug will be bent to the left, if marking the lug will be bent to the right. Thus for example in the case of the foremost, bar 324 Fig. 43 the outermost lug is bent to the left and accordingly the first impulse of the code which is to select this bar for operation will be a spacing impulse which maintains permutation bar 319 in the position shown. The next lug is bent to the right and therefore the second impulse of the code will be a marking impulse which will move the second permutation bar associated with this lug to the left.

It will be noted that by this method of making a permutation selecting mechanism, all of the code bars are exactly alike and all of the selecting bars are exactly of the same shape, the only difference between the selector bars residing in the manner in which the lugs are bent. By this arrangement the manufacture is simplified and cheapened. The selecting bars each of which is individual to a predetermined stock item, may have stamped at a convenient place, the stock designations of the stock which they represent. If it is desired to have a different stock appearing on the quotation board, it is only necessary to take out the corresponding bar and insert a bar in accordance with the stock desired. By simply rearranging the selector bars the stocks may be made to appear on the quotation board in any arrangement desired.

The selector bars 324 are pivotally mounted on a common pin 326 and are normally urged to rotate in a counterclockwise direction about this pivot by spring members 327, individual to the selector bars 324, each carried at one end by a common bar 328 and engaging its selector bars at the other end.

The selector bars 324 although normally urged downward by their individual springs 327 as described above, are normally held in elevated position by a universal member 331 which is secured to the bell crank 332 pivoted on the pin 333 suitably carried on the frame work of the apparatus. A spring 334 one end of which is secured to the member 332 and the other end to the frame work in any suitable manner, normally maintains the universal member 331 in a raised position, as shown, holding the selector bars 324 above permutation bars 319.

The end of the bell crank 332 is pivoted to a pin 335 which also carries a plunger 336 of the magnet 278. The magnet 278 which is energized immediately following the receipt of the codes for selecting a bar in the manner described above operates the plunger 336 moving it outwardly and rocking the bell crank 332 in a counterclockwise direction on pin 333 against the tension of spring 334 and the universal bar 331 is moved downwardly. At this time, the code bars 319 have been operated by received codes and the notches 320 are so positioned that all the lugs of one of the selector bars 324 are each opposite a notch. When therefore the universal bar 331 drops, this particular selector bar 324 will be free to drop with it until its lugs 325 are seated in the notches 320 of the permutation bars 319 below it.

Positioned in operative relation with each of the selector bars 324 are individual latch members 340 pivotally carried on a shaft 341 carried by the apparatus frame and normally held against their individual selector bars 324 by springs 341' (Figure 15). The opposite end 342 of each of these latch members 340 is normally in engagement with an individual lever arm 343 which in turn controls the member 344 carrying a bank of spring contacts 345. Each of these spring contacts 345 is in operative relation with an associated spring contact 346 with which it normally tends to engage by its own spring action, but is normally held from engaging this contact by arm 343 and latch member 340. As will appear hereinafter, each bank of contacts 345 controls circuits to individual stock items. When a selector bar 324 drops into the notches as described above it rocks the associated latch member 340 about its shaft 341 until the end portion 342 is adjacent the notched portion 347 on the bar 343. The bar 343 is then no longer held to the left by latch 340 and is forced to the right by spring contacts 345 through arm 344 until all the contacts 345 engage their opposite spring contacts 346.

Following the operations described above, the magnet 278 is de-energized and spring 334 again rocks the member 332 about its pivot 333 raising the universal member 331 to its upper position and removing the operated selector bar to its raised or non-operated position. The end portion 342 of member 340 however remains in the notch 347 of latch member 343 so that the closed contact bank 345 remains locked in operated position. As will appear more fully hereinafter, this leaves the marking and spacing selector magnets free to operate the code bars in accordance with a succeeding code combination of impulses while the previous set-up remains locked.

In order to open these contacts, the magnet 267 is energized in the manner described in detail above. Magnet 267 is provided with a plunger 352 carried on a pin 353 supported by the lower end of a lever 354 pivoted on the pin 355. The opposite end of the lever 354 carries a universal member 356 which is in operative relation at its other end with all of the latch members 343. A spring 357 normally maintains member 356 in its right hand position so that it is not in the path of the members 343 when one of these is moved to the right in the manner described above.

In response however to the energization of the magnet 267, the plunger 352 is moved to the right, rocking the member 354 in a counterclockwise direction and moving the member 356 to the left. As a result of this movement, member 356 in turn moves the operated latch member 343 and its associated spring contact carrying member 344 to the left disengaging the operated contacts. The operated member 340 is then rocked counterclockwise by action of its spring 341' until it re-engages its bar 324. In this manner the apparatus is restored to normal following a code selection operation as described above.

Referring now again to Figure 15, the contact carrying arm 344 is shown provided with a bank of thirteen pairs of contacts 345 and 346. Each such bank of contacts is individual to a set of item indicators 371 for a single stock item and is electrically connected thereto. The item or stock indicators 371 comprise twenty different indicator units, there being four indicators 372 to 375 in each of five horizontal rows. The first three indicators 372 to 374 indicate the first three numerals, hundreds, tens and units respectively of the quotation of the item. Thus for example they may indicate the numbers 6, 4, 3 respectively of a quotation 643. The last indicator 375 will operate to indicate fractions such as ⅞, ⅝ and so on.

Each horizontal row of these indicators is individual to a different quotation as for example, closing, opening, high, low and last. Thus for example the units 372 to 375 may represent the last, the units in the horizontal row 376 may indicate the low quotation, those in row 377 the high, those in row 378 the opening and those in row 379 the closing quotation. It will be understood however that this choice is arbitrary and may be arranged in any desired manner. It will also be understood that once chosen, the set will be permanently marked as shown in Figure 2 so that when the indicators are operated to indicate the quotation it will be understood what quotation is indicated. It will also be understood that each set of indicators 371 has stamped thereon the stock designation of the stock which they represent.

In a preferred embodiment each indicator 371 comprises two windings 381 and 382 angularly disposed with respect to each other. As will be described in detail hereinafter, the amplitude of the current flowing through each of these windings 381 and 382, is varied by the received code and causes a rotation of a pointer in proportion to the amplitude and direction of this current flow. A third set of windings 383 is operated together with the operations of the windings 381 and 382 which normally locks all the indicators but in response to a special signal releases a particular horizontal row of indicators to be operated to positions in accordance with the received codes.

It will be noted that all of the windings of the indicators in a vertical column are connected in series circuits so that the currents tend to operate all of the indicators simultaneously. Inasmuch, however, as only one of the horizontal groups of locking windings 383 are energized, depending upon the particular quotation, the indicators in this horizontal row will be released and the others will not respond to the code as will be described more fully hereinafter.

It will be noted that by this arrangement, there are only thirteen wires coming from each stock unit for the control of twenty indicators, so that there are a less number of control wires than the number of indicators. Only two stock groups of indicators are shown in Figure 15, but there would actually be in each unit of the stock board a much larger number, as for example, say, 48 or more, so that by this arrangement there will also be a less number of wires than the number of stocks controlled leading from the quotation board to the master distributor.

The windings 381 in a vertical column are connected in series and are connected over conductor 384 to an individual contact 345 on the contact control arm 344. Similarly the remaining groups of windings including the locking windings 383 are connected over individual conductors to contacts on arm 344. The opposite contact 346 of each of the first eight pairs of contacts on this bank are connected over the set of conductors 386 and 387 to the contacts of the armatures of receiving relays 225 to 239, Figure 14. The armature contacts of the receiving relays 244 to 247 are connected through the group of conductors 388 and the contacts 345 and 346 to control the locking circuits of the second to the fifth horizontal row of indicators 376 to 379.

One contact of the ninth pair on bank of contacts 344, it will be noted is connected to the positive side of battery and the other to the lowermost horizontal row of indicators, so that upon each operation of contact controller 344 this row of indicators is unlocked. It will be noted that all the windings of the indicators are connected over a common conductor 389 to ground. It will also be noted that the conductors from the receiving relays 225 to 247 multiple to other contact groups individual to other item indicators so that these relays control any set of indicators depending on the previous selection.

As stated, each set of indicators is individual to a stock unit. The general appearance of the part of one of such stock units 39 is shown in Figure 2. As shown in Figure 41 these units 39 are carried on studs 396 mounted on a frame 397. The multiple connectors 398 snap between springs 399 on the frame 397. As will be clear from Figure 41, these units can be easily lifted out by raising the unit until the opening thereon coincides with the head of the stud. The connectors 398 will slip out of the spring 399 as the unit is carried over the head of the stud 396. A different unit can thus quickly replace any other, the multiple connector being so arranged as to automatically take care of the electrical connections from the stock unit to the frame of the board.

Having described the circuits of the indicators, the detail mechanism of a preferred form of indicator will now be described.

Referring to Figures 30 to 32, it will be noted that by varying the relative directions of a field, a magnetic needle may be made to assume any number of desired positions. In the present instance twelve such positions are desired, one for each of the ten numbers 0 to 9 and two blank positions. Two current values; namely a strong and weak, are used, the ratio of the two current values ranging from 1.0 to 3.7; that is, with a weak current of a fixed direction through one of the two windings of an indicator, the pointer thereof will assume two different angular positions in accordance with whether a weak or strong current flows through the second winding. Further positions may be obtained by reversing the direction of the current using strong and weak current in the second winding etc.

Assuming a current flow in a predetermined direction, if the horizontal component due to this current in one winding is small and the vertical component due to current in the second winding is large, the field will assume a position 15° to the right of the vertical, as shown in Figure 30, the cotangent of the angle formed with the vertical being the vertical component over the horizontal component of 3.7. If currents in both windings are strong; that is, of the same value, the field will assume a position at an angle of 45°, the cotangent being 1, as shown in Figure 31, and if the vertical component is small and the horizontal component large, the field will assume a position 75° to the right of the vertical, as shown in Figure 32, it being understood of course that if the currents in both coils are simultaneously small or large the same reading will result. By changing the direction of current flow in one with respect to the other, or in both, the direction of the component magnetic fields are changed and as a result three positions may be obtained in each of the other quadrants, providing therefore twelve different indications. It will be understood however that the particular values assumed are arbitrary and may be varied as desired.

In Figure 27, I show one embodiment of the indicator. Iron disks 401 are provided with two windings 402 and 403 positioned at right angles to each other. The current flowing through these two windings will produce a resultant field as shown in the diagrams in Figures 30 to 32 for rotating pivoted indicator (not shown) to assume a position in the field in accordance with the resultant field obtained.

In Figure 28 a modified form of this indicator is shown in which a plurality of punchings 404 are cut on the circumferential edge of the disks 401 and coils 402 and 403 wound therein are divided into four separate equal parts and divided into pairs 405 and 406 fastened together so as to produce a north pole on one side of the disks and a south pole on the other. In this arrangement by varying the direction of the current in the two windings, strong magnetic poles can be produced on opposite sides of the disks.

In Figures 29 and 33 a more detailed showing of the structure is shown. The armature 407 is wound as shown in Figure 28 and is mounted upon a stud 408 secured to the base 409. A strong permanent U shaped magnet 410 is secured fast to a spindle 411 the inner end of which has a bearing in a recess in stud 408 in engagement with a ball 412 at the base of the recess. Fast to the magnet is a drum 413 having on its circumferential edge the numbers or other indications which it is desired to exhibit. Also secured to the drum is a star wheel 414 having twelve teeth. It will be evident that according to the relative strength and direction of the current in the windings, the magnet 410 and the drum 413 will assume a corresponding position. The star wheel 414 is arranged to be engaged by a pawl 415, forced into engagement therewith by a spring 416 and adapted to be disengaged by a locking magnet 417.

On the inside of the drum 413 there is secured a spring 418 having at its lower end a weight. Secured to the base 409 is an upstanding ring 419 so located that when the drum 413 is slowly rotated, the tip of the spring 418 just clears the inner side of the ring 419. When the drum moves rapidly however, centrifugal force will drive the tip of the spring 418 outwardly and it will rub on the ring 419 to retard excessive oscillations of the drum acting as a dampening means. It will be understood that in the above description, coils 402 and 403 are the equivalent of coils 381 and 382 in Figure 15 and magnet 417 to the locking winding 383. The locking magnet when energized rocks its pawl 415 so that it disengages a tooth on the wheel 414 releasing the drum 413 for rotation in accordance with the direction and magnitude of the current flowing through the two coils 381 and 382. Having described the circuits and apparatus at the receiver, the operation thereof will now be described.

Normally the brushes carried by the arm 282 Figure 13 of the distributor 207 are latched against rotation and engage the first segment of their respective rings as shown. In response to the first or starting impulse transmitted in a manner described in detail above, relay 201 operates its armature 202 to engage contact 203 connected to the negative side of source of power and an energizing circuit is completed for the start magnet 296 from the negative side of the source of power through the contact 203 over armature 202 conductor 205, ring 206, brushes 211 and 213 over the first segment of the ring 209 and through the start magnet 296 to the positive side of the source of power. Magnet 296 upon energization moves armature 295 from the path of the arm 282 and the arm 282 carrying brushes 211 to 213, 253 and 254 is released for rotation. As the brushes rotate over the second segments of their respective rings, the first of the code impulses is received over the conductor 155. The receiving line relay 201 responds thereto moving its armature 202 to either of its contacts 203 or 204 depending on whether the impulse is a spacing or marking impulse. If the armature 202 engages contact 203 in response to a spacing impulse, a circuit is completed from the negative side of the source of power over the circuit traced above to brush 211, through segment 218 on ring 208 with which the brush 212 is at that time in engagement and over conductor 219 to spacing selector magnet 220 Figure 15, which is connected to the positive side of the source of power. If the received impulse is a marking impulse the armature 202 engages the contact 204 and the circuit is traced over the segment of ring 209 with which the brush 213 is at that time in engagement and over the conductor 216 to the marking selector magnet 217 connected to the negative side of the source of power. In this manner either one or the other of these two selector magnets are energized depending upon the character of the received impulse. As the brushes 212 and 213 wipe over the next fourteen segments on their respective rings 208 and 209 the code combinations of impulses from the first three transmitters are received and selector magnets 217 and 220 are selectively operated to variably operate the code bars 319.

Returning now to the distributors, after the brushes 212 and 213 have left the first fifteen segments on rings 208 and 209 they wipe over the next group of fifteen segments 221 and impulses are transmitted from armature 202 over these segments and conductors 222 to the polar relays 223 Figure 14. If the impulse is a marking impulse, armature 202 engages contact 204 and current from the positive side of battery will flow over the particular conductor 222 connected to the segment over which the brush 213 is at that instant moving. The circuit for this current will be completed through the winding of the polar relay 223 connected to this conductor 222 and to ground. The current through this relay will operate its armature to engage its upper contact. If, on the other hand, the impulse had been spacing, the current flowing through the polar relay 223 would have been such as to throw its armature to engage its lower contact. This operation occurs for each of the polar relays 223 as the brush 213 wipes over the next fifteen segments 221 and the armatures of all of the relays 223 are operated to either their lower or upper positions depending upon the codes transmitted by the fourth to seventh transmitter keyboard section.

As brush 213 continues over the next four segments 241, a code from the last transmitter keyboard section is received to selectively operate the polar relays 243 in a similar manner.

When the brush 254 engages segment 255 which, it will be noted occurs an interval after the code from the first three transmitters is received for operating the selectors, a circuit is completed for the start magnet 257 from ground through the ring 251, brushes 253 and 254 to segment 255, conductor 256 and start magnet 257 in the positive side of battery. On energization of magnet 257, armature 304 is withdrawn from the path of arm 301 and the latter is released for rotation. The location of segment 255 in ring 252 is selected to insure proper timing of operation of dependent elements; namely, the range relays 243, Fig. 14.

As the brush 263 wipes over the first four segments 265 on the ring 261, a circuit is completed from the negative side of a source of power over the brushes 264 and 263 segments 265 and over conductor 266, to magnet 267, Figure 15, which as described above restores the previously operated contact controller 344 to its normal position opening its spring contacts.

During this period, the brush 273 wipes over the segment 276 and a circuit is completed from the positive side of battery over the ring 272 brushes 273 and 274, segment 276, conductor 279, over the various operated armatures of the relays 223 and 243, Fig. 14, and which as described above, have been operated in accordance with received codes while the brushes 212 and 213 were wiping over the first fifteen segments, through the upper or lower windings of relays 225 to 247 in accordance with the positions of the armatures of relays 223 and 243. Thus for example, if the first relay 223 was energized by a marking impulse to move its armature to its upper position, the circuit traced above over conductor 279 is completed through the armature of relay 223, its upper contact and through the upper winding of polar relay 225 to ground. On the other hand had the first relay 223 been energized by a spacing impulse and its armature moved to its lower position, a circuit would have been completed through the lower windings of relay 225 to ground. Depending upon whether the upper or lower winding of relay 225 is energized, its armature in turn will engage its upper or lower contact. A circuit for each of the other relays 226 to 247 is completed over similar circuits and accordingly these relays are now positioned in accordance with the operation of relays 223 and 243.

Immediately after brush 273 leaves segment 276, the receiver relays 223 and 243 are free to be operated in accordance with a new code and the arm 282 will restore to normal position shortly thereafter. An overlap is thus provided, relays 223 and 243 being operated by a new code while the item indicators are operated in accordance with the preceding code as will now be described.

The brush 273 next engages the segment 275 at which point a circuit is completed from the positive side of the battery over the ring 272, brushes 273 and 274, segment 275, conductor 277, through the winding of the selector operating magnet 278, Figure 15. This magnet upon energization permits the selected selector bar 324 to drop until its lugs are in the notches of the permutation bars 319.

As has already been explained, for each marking impulse received, a marking magnet 217 connected to the segment over which the brush 213 is at the instant wiping when the impulse is received, is energized and operates its armature 312 to move its associated code bar 319 to the right until it is latched by the armature 317 of the associated magnet 220. If this code bar had already been moved to its marking position by the previous code the marking impulse as described above will have no effect thereon. For each spacing impulse the spacing magnet 220 associated with the segment over which the brush 212 is wiping when the impulse is received, is energized and operates its associated armature 317 to disengage its associated code bar 319. If the code bar is in a marking position due to a previous operation by the marking magnet in the previous code, the removal of the armature 317 from the notch 321 of the code bar releases the bar to permit movement thereof to its left position by its spring 323. If on the other hand, the code bar is already in its spacing position, the operation of the armature 317 has no effect at this time. In this manner all of the code bars are positioned in accordance with the code of first fifteen impulses received.

As described, the lugs on each of the selector bars 324 are so arranged that for one combination of all of the code bars, these lugs will be adjacent a notch. One of these bars is thus conditioned for operation when magnet 278 is energized as described above and through bell crank 332 moves the member 331 downwardly permitting all the selector bars 324 to rock on their pivot 326. The downward movement of all the bars but one will be stopped when one of their lugs engage the upper surface of a code bar. The selected bar will however continue downward until its lugs enter the slots 320 on the code bars 319.

As this selector bar 324 drops it will rock its associated latch bar 340 about its pivot 341 in a clockwise direction and the end 342 thereof comes opposite the notched portion 347 of the bar 343. Normally bar 343 is held in its extreme left hand position by the latch bar 340. When the member 340 moves opposite the notched portion, the released member 343 is moved to the right by its associated spring contact controller 344 which moves therewith causing all of its contacts 345 and 346 to engage.

These contacts as shown in Figure 15 are individual to and associated with a predetermined set of indicators 371 of a specific item. When these contacts are closed, circuits over conductors 384, 385 etc., from these indicators extend to the armature of relays 225 to 247 Figure 14. At this time brush 263 is wiping over the segments 268 and the brush 273 is wiping over segment 280.

A circuit from the negative side of battery accordingly extends over the ring 262, brushes 264 and 263 and segments 268 to the conductor 269. A second circuit extends from the positive side of battery over the ring 272, brushes 273 and 274 and segment 280 to the conductor 281. Conductors 269 and 281 as shown in Figure 14 extend to the contacts of all the armatures of relays 225 to 238, conductor 281 extending to the upper contacts of the armatures of the relays 225 to 237 and conductor 269 to the lower contacts.

As has been explained, the armatures of these relays have been operated to either their upper or lower positions depending upon the codes received while the brush 213 was wiping over the fifteen segments 221, these codes being transmitted by the fourth to seventh sets of transmitter keyboard sections for operating the selected indicators to indicate a particular quotation.

To illustrate one of the circuits completed, it will be assumed that the armature of relay 225 engages its upper contact and the armature of relay 227 is moved to its lower contact a circuit from the positive side of battery is then completed over the conductor 281 as described above. This circuit continues through the resistance connected between this conductor and the upper contact of the armature of relay 225, through this contact of the armature to the armature of the relay 227 which engages its lower contact and shunts the resistance connected thereto and over a conductor 387 through the eighth from the right contact on the contact group 344 and through the windings in the vertical group connected in series with the winding 372.

It will be noted that this circuit is of a predetermined polarity determined by the fact that the armature of relay 225 is in engagement with its upper contact. Had the armature 225 been in engagement with its lower contact, the same circuit would have been completed except that it would have extended from the negative side of battery over the conductor 269 which is connected to this lower contact. Accordingly the indicators in series with coil 372 will tend to operate in a predetermined angular direction.

It will also be noted that the magnitude of the current flowing in this circuit is determined by the operation of the armature of relay 227. Had the armature of relay 227 been moved to its upper position, the circuit would have included the resistance connected thereto and would therefore have been smaller. It is clear from the above then that by the operation of the armatures of relays 225 and 227 that the indicators connected in series with the coil 372 are controlled by currents of a predetermined direction and amplitude, providing therefore four different values for one coil of the indicators; a weak and strong current flowing in one direction and a weak and strong current flowing in the opposite direction. Similarly by operation of other pairs of armatures of relays 225 to 239, a second series of coils in the vertical group of indicators 372 are operated in accordance with four different current values. As has been explained in detail above these currents provide 12 different components for moving the indicators to twelve different angular positions. In this manner all of the indicators in set 371 connected to the group of contacts 344 tend to operate in accordance with the received codes.

As a result of each selection of a set of indicators for a stock unit, the lowermost horizontal group of locking coils 383 connected in series will energize over a circuit from the positive side of battery over the ninth contact from the right on bank 344 and through the windings 383 connected in series. The pawls 415 release the indicator coils in this row, all of which are therefore free to be operated by the currents flowing therethrough as described above.

If a particular type of quotation, such as high, low, etc., is desired one of the relays 244 to 247 is energized as described above and completes a circuit to its individual horizontal group of locking relays such as 383. The indicators in that group are then also released to respond to the currents flowing through them. Accordingly only those indicators which it is desired should respond to the signals are released for operation. In this manner the indicators remain operated in accordance with the last setting until a new code for changing them is received.

The brushes on both distributors 207 and 258 continue to complete their revolutions until they return to the position shown at which point the start magnets 296 and 257 being in non-operated position, the arms carrying the brushes are again latched from rotation until again released by a succeeding code whereupon the above cycle of operations is repeated.

Modifications

In the system described in the above, the transmitter shown and described comprises a plurality of key board transmitters. It will be understood however that other forms of transmitters such as an automatic tape controlled transmitter may be employed. Such an arrangement is shown in Figures 9 to 12. A tape 430, Figure 10, of the usual construction is perforated in accordance with code combinations of impulses by any well known form of perforator 431, the perforations being arranged across the tape as shown at 432 and the tape is further provided with a central longitudinal series of feeding perforations 433. The tape 430 is moved between guide plates 435 and 436 after being perforated in a manner to be described.

Projecting into and partially through apertures in the guide plate 436 are a plurality of groups of feeler pins 437 to 444 which are arranged to move upwardly into the perforations, there being one such feeler for each perforation which can be arranged across the tape. In the present illustration, inasmuch as a five unit code is being employed, five such feelers are provided in each group, although not all of them are used as will be explained. When the code transmitter is not operating, the feeler pins 437 to 444 are held in their lowermost position as will be described so that their upper ends are clear of the tape 430. The feeler pins in each of the groups 437 to 444 are pivoted at 445 to individual levers 446 to 453 pivoted at 454 and normally resting on pins 455 which are carried on a universal bar 456. The universal bar 456 normally rests on armature 457 of the selector magnet 458 which is held in retracted position by gravity or by a tension spring (not shown) against stop 459. The universal bar 456 is provided with a projecting lug 460 to which one end of the spring 461 is secured, the other end of which is secured to the frame in a well known manner. As will appear more fully hereinafter magnet 458 is normally energized and holds the universal member 456 in its uppermost position against the tension of the spring 461. Member 456 in turn through its pins 455, holds the left end of pivoted levers 446 to 453 in elevated positions, which in turn hold feelers 437 to 444 in their lowermost positions and out of engagement with the perforated tape.

The universal member 456 is provided with a lateral arm 456' the end of which is provided with a pivot 461' to which is rotatably secured a pawl 464 the tooth of which engages successive teeth on the ratchet wheel 465 and is maintained in engagement therewith by a spring 464'. The ratchet wheel 465 is carried by and rotatable with a shaft 466 on which is mounted a large feed wheel 467 provided with a series of feed pins 468 which engage the perforations 433 along the center of the perforated tape. The ratchet wheel 465 is provided with seven teeth and the feed wheel 467 is provided with fifty-six pins. For each step of the ratchet wheel, the pin wheel moves the distance of eight spaces. The ratchet wheel 465 is also provided with a jockey 469 which engages the teeth of the ratchet 465 under control of a spring 470 to hold the shaft 466 in position while the perforation feelers 437 to 444 are operated into the perforations of the tape as will be described hereinafter.

Secured to each of the levers 446 to 453 are transfer contact controllers 471 to 478 operating between individual sets of contacts 481 and 482. Inasmuch as there are five levers in each of the groups 437 to 444 it will be clear that there may be five such sets of contacts controlled in each group. The code used with this transmitter is however the same as that shown in connection with Figure 3 in which not all of the keyboard sections are operated on the five unit code. Accordingly not all of the transfer contact controllers shown will be used. All of course will be used in the first three groups 471 to 473 as they transmit a five unit code; only four will be used in the next three groups 474 to 476 which send four unit codes; three in group 477 which sends a three unit code and four in the group 478 which send single impulses over one of the four segments associated therewith. Only one such connection is shown in each group.

As shown the upper contacts 481 which the transfer contact controllers 471 to 478 may engage are connected in multiple and over conductor 485 to the negative side of a source of power 486 through a resistance 487. The lower contacts 482 are similarly connected in multiple over a conductor 488, through a resistance 489 to the positive side of a source of power 491. As in the case of the first described modification, although two sources of power 486 and 491 are shown it will be understood by those skilled in the art that a single source if preferred may be employed with a mid point connection for providing the two polarities necessary. The transfer contacts 471 to 478 are connected over individual conductors 492 to 499, to individual segments 501 on the segmental ring 502 of the distributor 503.

The distributor 503 comprises in addition to the segmental ring 502, a ring 505 which is connected to conductor 507, extending to remote or receiving stations as in the case of conductor 155. This conductor is adapted to repeat into the receiving relay 201 described in connection with Figure 13. As shown the rings 505 and 502 are bridged by brushes 509 and 510. Distributor 503 also comprises rings 512 and 513 bridged by brushes 514 and 515. The ring 512 is grounded and the ring 513 is provided with a single operating segment. Segment 516 is connected over the conductor 517 to magnet 458 which controls the universal member described above.

The brushes 514, 515, 509 and 510 are carried by arm 520 which in turn is driven by the drive shaft 521 of a motor (not shown) through a clutch 522 in the manner described in detail in connection with the key board transmitter described above.

Normally arm 520 is latched against rotation by engagement with a tooth on armature 525 of start magnet 526. Armature 525 is pivoted at 527 on the frame work 528 and is normally held in retracted position by the spring 529 while the magnet 526 is deenergized and the tooth of the armature 525 engages the path of the arm 520 thereby locking it against rotation.

The start magnet 526 is connected over the conductor 531 to a start key 532 and over conductor 534 to a contact 535 which is connected through battery 536 to ground. The contact 535 is engaged by a pivoted lever 537 provided with an arm control lever 538 which is in operative relation with the tape 430. Normally the system is in the condition shown. In order to start operating the switch 532 is closed and completes an energizing circuit for the start magnet 526. As is well understood by those skilled in the art, this circuit is also controlled by the lever 537 in accordance with the slack of the tape between the perforator and transmitter opening the contact 535. The circuit for the start magnet will not be closed until the slack of the tape between the perforator and transmitter is sufficient for satisfactory operation; that is, the perforator has made sufficient number of perforations in the tape to permit continued operation of the transmitter.

Upon energization of the magnet 526 the armature 525 is drawn from the path of the arm 520 and the latter carrying the brushes 514, 515, 509 and 510 is released for rotation. Normally a current of negative polarity flows over the line 507 from the negative side of the source of energy 486 over the conductor 485 through the brushes 510 and 509 and over conductor 507. This is the stop impulse. As the brushes move to the second segment, a start impulse is transmitted from the positive side of the source of energy 491 over the conductor 488 to the second segment which the brush 510 engages to conductor 507.

Simultaneously the brush 515 moves off the segment 516 and the normal energizing circuit for magnet 458 is opened.

Upon deenergization of the magnet 458 its armature 457 will move to its retracted position until it engages the stop 459. The pins 455 are accordingly moved downwardly by the spring action and levers 446 to 453 which it will be understood tend to follow the pins on which they rest are rocked in a counterclockwise direction moving the feelers 437 to 444 upwardly. Each feeler which is underneath a perforation in the tape will pass through the perforation and will in turn move its associated lever 446 to 453 a distance sufficient so that it in turn will rock transfer contact controllers 471 to 478 to engage the lower contacts 482. Those of the feelers, however, which are not under perforations will be held from movement and the levers 446 to 453 associated therewith will be prevented from rocking by the tape and accordingly will maintain their individual transfer contacts in engagement with their upper contacts 481.

Depending upon whether the contact controllers 471 to 478 engage their upper or lower contacts, codes of impulses will be transmitted from sources of power 486 and 491 through the upper or lower contacts 481 and 482, controllers 471 to 478, over their individual conductors 492 to 499, segments 501 and over brushes 510 and 509 to the conductor 507. In that manner code combinations of impulses are transmitted over the conductor 507 in accordance with the code perforated tape.

As a result of the downward movement of the universal member 456 under control of spring 461, the pawl 464 is moved down until it engages the next tooth on ratchet wheel 465. At the end of the revolution of arm 520 the brush 515 is restored to the position shown on segment 516 and the circuit for magnet 458 is again completed. Upon energization of the magnet 458, the armature 457 moves to its operated position again raising the universal member 456. The pins 455 rock the levers 446 to 453 about their pivots 454 to in turn withdraw the feelers 437 to 444 from the perforations in the tape freeing the tape for movement. The movement of member 456 also rotates the ratchet wheel 465 by means of pawl 464 through a distance sufficient to move the tape eight rows of perforation spaces as soon as the tape is freed as described above.

In the above a keyboard and tape transmitter system have been described. It will be clear accordingly that other forms of transmitters which are capable of transmitting the codes described may be utilized and are within the scope of the present invention.

*Modifications of the indicators*

In the just described system, the preferred form of indicator has been described. It will be clear that other forms of indicators may if preferred be utilized. Modifications of such apparatus are shown in Figures 34 to 36. In Figure 34 is shown one such type of indicator. A disk 550 with the desired characters 551 arranged about the circumferential edge thereof is carried on a drum 552 on which are wound two flexible cords 553 and 554. Cord 553 is attached to one end of a spring 555 the other end of which is connected to the framework. Spring 555 tends to rotate the disk 550 in a clockwise direction. The cord 554 is attached to a plunger 556 of a solenoid 557 which when energized tends to draw the plunger 556 towards itself and accordingly to rotate the drum 552 and disk 550 in a counterclockwise direction. The amplitude of the current through the winding of solenoid 557 is varied in the manner in connection with the first system described and accordingly rotates the disk 550 through variable angular distances to selectively display the characters.

Since the proper registration of an indication 551 is dependent upon the value of the supply voltage corresponding to a received code signal, it is accordingly proposed to regulate these values by means of the following system. A sensitive polar relay 562' which may be of the voltmeter type provides an armature 569 and a pair of contact points each of which connects with one of the leads 562. A voltage divider 574 shunts the leads 562 and a wire contacts the midpoint of the resistances 574 and is connected through the armature winding of motor 558 to the relay armature 569.

The motor 558 is reversibly wound as is indicated by the windings 559 which communicate with the leads 562. In accordance with its direction of rotation, the motor 558 is adapted to advance the threaded shaft 583 to the right or the left through the medium of the worm and gear assembly 584. A contactor 581 is carried by the shaft 583 and as the shaft is moved, so too the contactor establishes electrical connection between one terminal of the relay winding and some point on the resistance 575'. The fixed terminal of the resistance 575' is wired in series with an auxiliary current supply 574' and one of the leads 562.

The auxiliary supply 574' is made to supplement the main supply for the common purpose of maintaining a constant value between them, and this is accomplished in the following manner. Suppose the main current supply to drop in value. Immediately the polar relay armature 569 would move to the right, let us say, assuming this to be the direction corresponding to an auxiliary increase demand. The motor 558 would then start up, moving the threaded shaft to the left and cutting down the amount of resistance 581 in series with the auxiliary supply, thereby increasing the current output from the latter until, upon reaching normalcy in current value, armature 569 would break contact with its right hand point.

Should there happen to be a surge in the line unduly increasing the main supply potential, the converse adjustment would prevail yielding only when the normal current value was attained. The accuracy of a system such as this is largely dependent upon the sensitiveness of the relay 562' hence it is preferable to employ one of the voltmeter type on account of its characteristic responsiveness to slight current changes.

In Figure 35 there is shown another form of the indicator which may be referred to as the balanced type. In this arrangement two solenoids 601 and 602 corresponding to solenoid 557 and the spring 555 respectively in Figure 34 are utilized. In this arrangement connected to plunger 603 of the magnet 601 is a cord which is wound in a spiral groove 605 on a drum 606 carrying an indicator disk 607 similar in construction to disk 550. A second cord 608 secured to the plunger 609 of the solenoid magnet 602 is wound in a groove 610 on the drum 606.

By this arrangement the relative strength or amplitude of the currents in solenoids 601 and 602 determine the angular rotation of the disk 607 and a balanced electrical condition is obtained which is free of voltage fluctuations of the source. Figure 36 is a theoretical diagram of the resultant for various current values. In this figure the vertical component represents the torque for various currents flowing in solenoids 601 and 602 and the horizontal represents angular positions as shown. The line 615 represents the pull for a particular value of current in the solenoid 601 and the line 616 represents the pull for particular values of current in the solenoid 602. The resultant of the two pulls is found where the two lines cross.

As shown, the maximum torque of the solenoid 601 occurs when the indicator assumes zero position. As the indicator rotates, the torque is reduced, or until the numeral 10 is reached when the torque is zero. On the other hand at zero position the torque of solenoid 602 is increased and as the torque increases the indicator is rotated towards numeral 10.

The solenoids 601 and 602 are connected in series with conductors 621 and 623 connected in series with resistance 624. Connected at various points along resistance 624 are conductors 625 extending through contacts 626 on the contact bank 627 which is selected for operation in the manner described in detail in connection with the contact controller 344 Figure 15. Circuits from the alternate pairs of spring contacts on the bank 627 extend over conductors 628 to contacts on selector control relays 629 to 632. The circuits for the relays 629 to 632 are in turn controlled by receiving relays 633 to 636. As described in connection with Figure 14, the relays 633 to 636 are operated in response to received codes as in the case of the polar relay 223, and in turn operate the selector relays 629 to 632 as in the case of the relays 225 to 246.

It will be noted that the amount of resistance 624 connected in the circuit with solenoids 601 and 602 is varied in accordance with the operation of the relays 629 to 632, thus controlling the current flow therethrough. It will also be noted that as the current flowing through the solenoid 601 is decreased the current in solenoid 602 increases and vice versa. The circuit for these two coils may be traced from the positive side of the source of power, the armature of the relay 632 in engagement with one of its contacts and there successively over the armatures of the relays 631, 630 and 629 and their contacts to the resistance 624. The current then splits, part flowing over the conductor 621, to the solenoid 601 and the other part to the solenoid 602 and over the common conductor 623, to return over ground. Thus it will be clear that if the relays 629 to 632 are all operated so that their armatures engage their lower contacts, the circuit from the source of power would extend over the extreme left contact on bank 627 to solenoid 601 and a maximum current would flow therethrough, whereas substantially no current would flow through the solenoid 602 because of the interposed resistance 624. If the armatures of all the relays 629 to 632 were operated to engage their upper contacts substantially all of the current would flow through the solenoid 602 and substantially none through solenoid 601. Between these two extreme conditions, there may be any proportioning of current between solenoids 601 and 602 depending upon the selective operation of relays 629 to 632. These currents in turn cause angular rotations of the indicator disk in accordance therewith.

In connection with Figure 15, a preferred form of sets of indicators has been described. It will be clear however that other arrangements thereof may if preferred be used in connection with my system as shown in Figures 44 to 47 which will now be described.

In Figure 44, I have shown schematically a coordinate method of connecting the operating and locking windings in order to reduce the number of circuits required. The arrangement is shown for four stock quotation units, but the connections may be extended to any number of units desired.

The selector mechanism is similar to the stock selector shown in Figures 41 and 42 with some slight modification. Instead of the single group of contacts 345—346, there are two different groups of contacts, 661 individual to a group of indicator units and 662 individual to each of the stock item indicator units 663, the groups of contacts being electrically connected to the receiving polar relays 225 to 247 exactly as in the case of the group of contacts 344. Each group of contacts 661 and 662 is arranged to be closed when the code signals representing the stock individual to the group is received. Each of these groups of contacts is capable of being released by two or more selector bars 324 through pivoted latch bars 340 operating as shown in Figure 45 the contact controller 344. Thus for each of the stocks in this modification, there will be two selector bars, one adapted to close a set of contacts such as contacts 661 and the other to close a set of contacts such as contact 662.

The circuits from the group of contacts 661 extend to a vertical column of coils 664 to 671 of each of a group of indicators, the dotted lines indicating that other indicator sets may be connected thereto. The contacts in the group 662 are connected to the locking magnets 672 to 676, the details of which are shown in Figures 46 and 47. By this arrangement, a selecting code selects a plurality of groups of indicator units through the operation of bar 344 controlling contact group 661 but selects only one set of indicators in these groups by operating contact group 662.

As will be clear from the drawings, instead of providing an individual lock for each of the indicators, as in Figure 15, all of the indicators representing a single code quotation; that is, those in each horizontal row, are locked under control of individual magnets 672 to 676, there being but one such magnet for each horizontal row. These locking magnets 672 to 676 are provided with individual lock bars 677 which are in operative relation with the armature 678 of the associated magnet. Armature 678 is pivotally mounted on the frame 679 and normally held in retracted position by its individual spring 681.

The bars 677 are each provided with a notch 682 by means of which the bars are normally locked in position by engagement with projections 683 on a universal member 684.

Each of the lock bars 677 extends across the entire set of horizontal row indicators for a particular quotation and is provided with a set of pawls 688 one associated with each ratchet 691 of the indicators. Each of the pawls 688 is pivotally mounted on the lock bar 677 in a slot 682. With the lock bar 677 locked in the position shown, it will be evident that the indicators associated therewith are also locked by their individual pawl members 688.

Associated with each set of indicators is an unlocking magnet 693 the armature 693' of which is in operative relation with the universal member 684. Armature 693' is normally held in its retracted position by its individual spring 694 permitting the universal member 684 to move to its uppermost position by a spring member not shown.

In response to a code of impulses, for example, which operate the set of contacts 661, contact 695 is closed for completing a circuit for all of the unlocking magnets 693 of all the sets of indicators in series from ground to the positive side of battery through the contact 695 and through all of the coils of the unlocking magnets 693 in series to ground. Upon energization of the magnet 693, its armature 693' is operated to move the universal bar 684 downwardly releasing the latching bars 677 for operation as the projections 683 move out of the slots 682 as a result of the downward movement of the universal member 684.

Thereafter upon the closing of one of the sets of contacts 662, in the manner described in connection with the first system described for selecting a particular quotation, the circuit for one of the magnets 672 to 676 is closed. This magnet upon energization operates its armature 678 to move the latching member 677 to the right which in turn operates its locking pawls 688 to disengage the teeth on ratchet wheels 691. The indicator in this horizontal row are accordingly released for operation. It will be clear from the above that at one time only one row of such indicators are released for operation, the remaining rows of indicators being normally latched in operated position and not being responsive to the variable currents which will flow therethrough.

The operation of the indicators in a set is the same as in the case of the first set of indicators, described in connection with Figure 15. The locking operation is also similar, one row of indicators it should be noted, being unlocked in response to the closing of a contact 662. It will also be noted that the circuits from the receiving relays are multipled to each of the sets of contact controllers 661, 662 as in the case of Figure 15.

In the systems described above, indicators operating variably in accordance with the amplitude of current have been described. It will be clear, however, that other forms of indicators may be employed, as for example step by step operated indicators. The receiving circuit and indicator for such an operation are illustrated in Figures 16 to 18 which are now to be described.

As in the above illustrations the signaling line 710, Figure 16, may extend either from a keyboard operated transmitter set or a tape automatically operated transmitter set. As shown this conductor is connected to a polar relay 711 at the receiving station and comprises an armature 712 which operates between two contacts connected to opposite sides of a source of electrical power. Armature 712 is connected over a conductor 713 to a ring 715 of a distributor 716. Distributor 716 comprises in addition to the ring 715, a first segmental ring 717 and a second segmental ring 718, bridged by brushes 719 to 721 which are carried on an arm 722 shown broken away.

As in the case of the distributor system described in connection with Figure 13, the first fifteen segments of the segmental ring 717 are connected over conductors such as 723 and 724 to associated individual marking selector magnets 725 and 726, Figure 17, it being understood that there is a marking magnet for each of the first fifteen code impulses although only two such magnets are shown.

The first fifteen segments on the segmental distributor ring 718 are connected over conductors such as 727 and 728 to spacing selector magnets such as 729 and 730 respectively, it being understood that there are fifteen such selector magnets for the first fifteen code impulses. The selector magnets 725, 726, 729 and 730 control code bars 731 and through them selector bars 732 individual to stock quotation items as described in detail in connection with Figure 43.

The selector bars 732 as has already been described cooperate with the releasing magnet 734 and restoring magnet 735 to selectively control a group of contacts 736 which in turn control circuits over conductors 737 to 741 extending to individual magnets 745 to 749, Figure 18.

Magnets 745 to 749 are individual to a set of indicators for a specific set of item indicators 750 comprising indicators 751 to 754 for the hundreds, tens, units, fractions of a particular quotation such as high, low, last and so on. As will be understood, each of the other horizontal columns shown represents a different quotation of the item 750. As will appear more fully hereinafter the magnets 745 to 749 are selectively operated depending upon the particular quotation received to extend control circuits over a set of contacts 755 to 762 which extend to the switches 763 to 766 and to stepping magnets 767 to 770 respectively.

Each of the magnets 767 to 770 controls a step by step mechanism 771 pivoted at 772 and normally held in retracted position by an individual spring 773. Each of the magnets 767 to 770 has two windings which may be designated a restoring winding and a resetting winding. Teeth 774 and 775 of the pallet 771 are arranged to alternately engage with the teeth on the ratchet 776 which is fixed to the rotatable shaft 776' and to which shaft indicator 777 is fixed as shown in Figures 19 and 20. The disk indicator 777 is provided with a series of numeral characters arranged around the periphery as shown. A cover 778 mounted in any well known manner over the disk surface is provided with a slot 779 through which the selected numeral is visible as shown in Figure 20.

The shaft 776' also carries a cam 781 which cooperates with a spring contactor 782 normally in engagement with a contact 783 when the shaft 776' is on any other than zero position in such a position as to display one of the numerals through slot 779. Contact 783 disengages spring contactor 782 when the indicator is restored to zero position at which position no numeral is visible through the slot 779. As will be described hereinafter, this provides an automatic indication when the indicator is back to its normal or zero position.

The manner in which the stepping magnets 767 to 770 are operated will now be described in connection with the distributor 716. As explained above while the brushes 719 to 721 are rotating over the first fifteen segments selector magnets 725, 726, and 729 to 730 are energized to select the group of contacts to be closed individual to the particular kind of items.

While the brush 721 rotates over the remaining segments on the ring 718, a bank of polar relays 791 to 809 are selectively operated in accordance with the operation of the polar relay 711 by impulses received over the conductor 710, just as in the case of the selector magnets. It will be recalled that these impulses are codes for selectively operating the indicators selected by the codes of impulses received over the first fifteen segments on rings 717 and 718.

These relays 791 to 809 accordingly operate their armatures 811 in accordance with the polarity of impulses which operate relay 711. Armatures 811 of these relays in turn control circuits from a source of power 812 to conductors 813 and the bank of contacts 814 controlled by a universal bar 815 to a set of receiving relays 817 to 835. Universal bar 815 is controlled by a magnet 836 which is connected to the last segment on ring 717 and provides an overlap between relays 791 to 809 and 817 to 835. As will be described hereinafter, relays 817 to 835 are provided with armatures 837 to 855 which control the impulsing circuits to the magnets 767 to 770 for operating the stepping mechanism of the indicators.

The segmental ring 717, in addition to the fifteen segments described connected to the selector magnets, is provided with a special segment 861 near the end of its revolution which is connected over a conductor 862 to a magnet 863 Figure 17. Magnet 863 is provided with an armature 864 normally held in its retracted position by a spring 865 in the path of an arm 866 carrying brushes 867 to 869 of a distributor 871.

Distributor 871 comprises rings 872 to 874 bridged by the brushes 867 to 869 carried on the arm 866 which is driven by a motor (not shown) through clutch 870. Ring 872 is provided with a sector 875 which is connected to the positive side of a battery as shown. The ring 873 comprises a stop segment 877 on which the brush 868 normally rests and a segment 878 which is connected over a conductor 879 to the magnet 734 which as described in connection with the first embodiment of the receiving apparatus releases the selected selector for operating the group of contacts 736. The segmental ring 873 is provided with twenty segments 881, the alternate ones of which are connected together in multiple. One group is connected over a conductor 882 to the contact banks controlled by the magnets 745 to 749 and the remaining set of segments are connected over the conductor 883 similarly to the contact banks controlled by magnets 745 to 749. On energization of any of the magnets 745 to 749, as for example magnet 746, the circuits traced above from segment 881 to conductors 882 and 883 extend through the contacts such as 755 and 756 to the upper or resetting winding of magnets 769 and 770.

The segmental ring 874 is connected in a similar manner and is provided with twenty segments alternate ones of which are connected in multiple and then over conductors 884 and 885 to the banks of magnets 745 to 749 and then through individual switches 763 and 764 to the lower or resetting winding of stepping magnets 767 and 768.

As the distributor brushes 868 and 869 rotate over the first twenty segments, magnets 767 to 770 are repeatedly energized ten successive times and operate their associated mechanisms to restore through the energization of the lower windings thereof the indicator disks to normal. The circuit for the lower or restoring winding of these magnets are opened at contacts 763 to 766. As soon as the associated indicator is restored to normal it renders the magnets unresponsive to further impulsing over these circuits. This prevents the indicators from overstepping the normal. By having two windings on magnets 767 to 770, one for restoring and the other for resetting, the possibility of back-up paths is eliminated.

The segmental ring 873 is also segmented over its lower half comprising twenty-three segments 891, the alternate ones of which are multiplied together and connected to the positive side of the source of battery. The ring 872 is provided with a segment 892 which covers a space equivalent to one segment 891 connected to the positive side of battery. On the ring 872 there is also the segment 893 which is opposite two segments 891, a segment 894 which is opposite four segments 891, and a segment 895 which is opposite four segments 891.

In addition to the segmented ring 873 are segmented rings 1014 and 1015 which are traversed by brushes 1027 and 1028, respectively. Like segmented ring 873, the lower half of each of the rings 1014 and 1015 is segmented into segments corresponding to segments 892, 893, 894, and 895; that is, the ring 1014 has segments 1019, 1020, 1021, and 1022, whereas the ring 1015 has segments 1023, 1024, 1025, and 1026. The segments of rings 1014 and 1015 corresponding to segments 892, 893, 894, and 895, being of the same length as such segments, will be opposite the segments corresponding in number to the segments of the ring 873. The lower half of the ring 874 is divided in a manner similar to the lower half of ring 872 and includes segments 1016, 1017, and 1018. There, of course, are only three effective segments in the lower half of ring 874, as only three such segments are necessary for the required operation.

The lower half of the ring 1015 is allocated to the hundreds part of the quotation, the lower half of ring 1014 is allocated to the tens part of the quotation, the lower half of the ring 872 is individual to the units part of the quotation, and finally, the segments 1016, 1017, and 1018 of the ring 874 are individual to the fractions part of the quotation. The reason for providing separate distributor rings for the respective parts of the quotation is to avoid establishment of back-up circuits when a common battery connection is utilized.

As previously described, the relays 817 to 831 are allocated to the parts values of the quotation; that is, there are four relays of the group for the hundreds part, four relays for the tens, four relays for the units, and three relays for the fractions, the operation of the relays of the respective groups functioning to control the effectiveness of the segments of the rings 872, 874, 1014, and 1015 to control the degree of advancement of the step-by-step indicators.

The contacts of the relays 817, 818, 819, and 820 are connected to conductors 903, 901, 904, and 902 which, in turn, are connected to segments 1025, 1023, 1026, and 1024, respectively, of ring 1015. Likewise, the contacts of relays 821, 822, 823, and 824 are connected to the segments 1021, 1019, 1022, and 1020, respectively, of ring 1014. The contacts of relays 825, 826, 827, and 828 are connected to segments 894, 892, 895, and 893, respectively, of ring 875, whereas the contacts of relays 829, 830, and 831 are connected to segments 1017, 1018, and 1016, respectively of ring 874. On inspection of the armatures 837 to 855 of the relays 817 to 835, it will be noted that these relays are arranged in groups. Thus, for example, armatures 837 to 840 of relays 817 to 820 are connected in multiple over a conductor 910 which connects to contacts 762 controlled by the magnets 745 to 749, and from these extends to the first stepping magnet 767 of each horizontal group of indicators (Fig. 18).

It will be clear from the above description that upon the selective energization of any combination of relays 817 to 820, a circuit will be completed for the upper winding of stepping magnet 767. In order to determine the number of impulses, however, to be transmitted to this particular stepping magnet, one or more of the relays 817 to 820 will be energized by the received code combination of impulses. These relays, upon being energized, control the effectiveness of the segments 1023, 1024, 1025, and 1026 with the multiple segments 891 of ring 873 to cause the corresponding advancement of the indicator rendered effective through the contacts 736; that is, for segment 1023 the indicator will be advanced one step, two steps for the segment 1024, and four steps each for the segments 1025 and 1026.

Significant is the fact that the relays 832, 833, 834, and 835 control the circuits through the contacts 736 to control the electromagnets 745—748.

Similarly the armatures of relays 821 to 824 are connected in multiple and connected over conductor 911, contacts 761 and to the stepping magnets 768. The group of armatures associated with the relays 825 to 828 are connected over conductor 912, contacts 760 and to the stepping magnets 769 and the armatures of relays 829 to 832 are connected over the conductor 913 to the contacts 759 and to the stepping magnets 770.

The operation of this system will now be described. The codes of impulses received over the conductor 710 variably operate the polar relay 711 to move its armature 712 from one to the other contact. Normally the armature 712 is maintained in connection with the contacts associated with the positive side of battery and the start magnet connected thereto is also connected to the positive side of battery and therefore deenergized. Upon the receipt of a start impulse, the armature 712 engages the negative side of the source of battery and a circuit is completed therefrom over armature 712, conductor 713, ring 715, brushes 719 and 721 through the first segment of ring 718 and the magnet winding 714 to the positive side of the battery. Winding 714 is energized and operates its armature 714' to release the arm 722. Brushes 719 to 721 carried by the arm 722 are now rotated, the rotating power therefor being supplied from a motor and driven at a predetermined speed for synchronism, as in the case of the first modification of the receiver described above.

As the brushes 720 and 721 move over the first fifteen segments 717 and 718, circuits are completed to either the marking selector magnets 725 and 726 or spacing selector magnets 729 and 730 through the segments 717 and 718 respectively depending upon the operation of the armature 712 of the polar relay 711 in response to the impulses over the conductor 710. When these selector magnets are operated, they select a selector bar 732 for operation.

As the brush arm 722 continues to rotate, positive or negative impulses are transmitted to the receiving relays 791 to 809 from the armature 712 and over ring 715 brush 719 to brush 721 and over the conductors connected to the lower group of segments on the ring 718 to the polar relays returning over ground. These polar relays operate their armatures 811 to engage their upper or lower contacts depending upon the polarity of the impulses transmitted through the relay windings as described above.

As the arm 722 continues to rotate, the brush 720 engages the segment 861 and a circuit is completed to either polarity of battery at the armature 712 over conductor 713, ring 715, brushes 719 and 720, segment 861 and over conductor 862 and the start magnet 863 returning over the ground circuit. The armature 864 of the start magnet 863 is operated releasing the arm 866 carrying the brushes 867 to 869 for rotation. When the brush 720 engages the last segment in ring 717, an obvious circuit is completed for a magnet 836 from ring 717. The relays 817 to 835 are operated in accordance with the operation of relays 791 to 809.

It will be understood, that the drive means for arm 866 is the same as that in connection with the distributor arm 722 so that the two are rotated at about the same speed and therefore remain about the same distance apart. As brushes 868 and 869 rotate over their first segments 878, circuits are completed for the magnets 734 and 735 which complete the operation of the selected selector bar as described above for operating the set of contacts 736. As in the first case, the selective energization of one of the last four receiving relays 832 to 835 will determine which horizontal row of indicators is to be operated. Upon closing of the bank of contacts 736, a circuit is completed from the positive side of battery through an armature of one of the relays 832 to 835 over a conductor 934, contacts of bank 736 and over the magnets 745 to 749 depending on which of the relays 832 to 835 is energized. It will be assumed that magnet 746 is energized. It will be noted also that magnet 749 is invariably energized inasmuch as the first or right hand contact on bank 736 to which this magnet is connected, is connected to positive battery. The set of indicators controlled by this magnet always operate as they indicate the last quotation.

As a result of the energization of magnet 746, the contacts 755 to 762 are closed to prepare operating circuits for stepping magnets 767 to 770.

As the brushes 868 to 869 continue to rotate over the segments 873 and 874, ten successive impulses are impressed over the conductors 882 to 885 from the positive side of battery over the brush 867, and brushes 868 and 869, the two sets of ten segments of ring 873 over conductors 882 and 883, the two sets of ten segments of ring 874 over conductors 884 and 885, through the contacts 755 to 758 and contacts 763 to 766 to magnets 767 to 770. These magnets are thus operated by ten successive impulses to in turn operate their associated stepping mechanisms 771, rotating the ratchet 776 and the associated indicator disk 777. In this manner all of the indicators are first restored to normal. It will be understood however that other means may be employed to restore the indicators to normal.

When the indicators are normalized, contacts 763 to 766 are opened, preventing the indicators from overstepping their normal or zero position. When, now, brush 1028 passes over segment 1023, a single impulse is transmitted from the positive side of battery over segment 1091, brushes 868 and 1028, to conductor 901. If the armature of relay 818 is operated to engage the contact connected to conductor 901, a single impulse will be transmitted over the conductor 910 to which that armature is connected for operating the indicator individual to that conductor for a single step; that is, the upper winding of electromagnet 767 for the hundreds part of the quotation will be energized to cause the advancement of the indicator one step. It will be assumed for illustration that the polar relay 818 has been operated for its armature 838 to engage its upper contact. The circuit extends over conductor 901, the upper contact and armature 838, over the conductor 910 to which the armature 838 is connected, contact 762 and the upper winding of the stepping magnet 767, which is then given a single operation. The stepping magnet 767 accordingly rotates its indicator one step, indicating for the hundreds digit of the quotation the unit "one."

It will also be assumed that the relay 823 has been operated to cause its armature 843 to engage its upper contact and that the polar relays 827 and 831 have been operated. As the result of the operation of relay 823, a circuit extends from the positive side of battery over the segments 891 and 1022 and the conductor connected thereto through the contact and armature 843, conductor 911, contact 761 to the upper winding of the stepping magnet 768. It will be noted that as the brush 1027 wipes over the segment 1022, the brush 868 wipes over segments 891 connected to positive side of battery, so that four impulses are transmitted over the conductor connected to the segment 1022 to operate correspondingly the stepping magnet 768. Similarly, as a result of the energization of the other polar relay 827, four impulses are transmitted through the armature 847, conductor 912 and the upper winding of the stepping magnet 769. Consequently, stepping magnet 769 will be correspondingly energized for causing the advancement of the indicator accordingly. As the result of the energization of relay 831, a single impulse from segment 1016 is transmitted to operate the stepping magnet 770 of the fractions part of the indicator.

It is to be noted that by means of the four segments 892, 893, 894 and 895 which are respectively capable of communicating one, two, three, and four stepping impulses it is possible to send any number of impulses ranging from one to eleven. This is accomplished by variously permuting these segments so as to give the desired number of impulses. Thus, if the digit seven is to be displayed upon an indicator seven impulses are required hence the segments 892, 893 and 894 are made effective and their respective impulses of one, two and four are successively transmitted. Correspondingly, if any other number is desired those segments are selected whose sum total number of impulses are equal to that number desired.

In accordance with this system the four digit indicators 767 to 770 are simultaneously set. Though each receives its impulses over a separate line 910 to 913 the several corresponding impulses for each of the indicator magnets 767 to 770 do in fact originate from the same segments 891 but are delegated their respective and proper number of impulses in accordance with the settings of the stepping relays 817 to 831. To better understand the operation of this system an arbitrary quotation will be recorded consisting of the number 130½. To indicate this number the hundreds indicator shall receive one pulse, the tens indicator three pulses, the units indicator ten pulses, and the fractions indicator four pulses. The reason that the fractions indicator only receives four pulses to record a ½ indication is that it represents its indications in terms of eighths whereas the other indicators are divided into tenths.

It will be recalled that the incoming price signals are first stored in the primary relays 791 to 809 together with the range signals, thence they are correspondingly transferred to the secondary relays 817 to 835 already referred to as the stepping relays. In accordance with the present quotation the hundreds secondary relays, which include those labeled 817, 818, 819 and 820, will be required to permit one stepping impulse hence only the relay 818 will receive a plus signaling impulse and shift its armature 838 to its up position. Of the tens relays which include those labeled 821, 822, 823 and 824 both 822 and 824 will receive such signaling impulses. Of the units relays which include those labeled 825, 826, 827 and 828 those which are to be operated to step ten pulses include 825, 827 and 828. Finally, of the fractions relays which include those labeled 829, 830 and 831 the one labeled 830 will transmit the necessary four pulses.

With the above relays locked as described when the brushes 867 and 868 wipe across the stepping segments 891 the proper impulses will be simultaneously transmitted to the selected range indicators, thereby effecting a savings in the time necessary to record the quotation in contradistinction with that of the successively transmitted line signal impulses.

The brush carrying arm 722 when it has made a complete revolution is restored to normal and thereupon only released in response to the energization of magnet 714 in response to the first or start impulse of the next code. It will be noted then an overlap is provided. As the brushes on the distributor 716 make a second revolution and receive the succeeding code, relays 791 to 809 are operated as described in accordance therewith while the relays 817 to 835 are at this time operated in accordance with the preceding or first code for operating the indicator in accordance therewith. The arm 866 is arranged to return to its normal stop position shown in sufficient time ahead of the arrival of the distributor brush 720 to segment 861 so that the start magnet 863 is energized and releases the arm 866. The brushes 869 and 868 upon rotation restore the operated selector bar of the previous code and operate the newly selected one in accordance with the new setting and also restore the indicators to normal position and operate them again in accordance with the new setting of the relays 817 to 835. The operations as described above are then repeated.

As already mentioned in the foregoing description in connection with the general system, it is within the scope of this invention to provide not only for the selection and operation of individual stock indicators as already fully described, but also for the simultaneous selection and operation of stock tape printers or tickers. In Figure 21 there is illustrated diagrammatically one form of an auxiliary system such as is contemplated, showing associated therewith several stock tickers individually operative under various conditions as will be more fully described.

The price and range signals are communicated from the primary storage relays 791 to 809 over a set of branch wires 949 to certain ones of a plurality of segments constituting one of two distributor rings 950 and 952. Stock tickers of the class preferably employed in this capacity are of the start-stop type such as one of which is fully disclosed and forms the subject matter of copending application, Serial No. 348,612, filed March 20, 1929. Characteristic of this class of devices is the particular signaling system where in addition to the six code impulses there is a preceding start impulse and a concluding stop impulse. In order to conform the stock quotation signals employed in the general system herein disclosed to the peculiar requirements of start-stop printers, the distributor 951 is provided and the translation is performed as follows.

The ring 950 is divided into a plurality of segments, the first of which is connected to a common positive source of current. This is the line condition during the time in which the printers are held in abeyance and is known as the stop pulse. The printers will not be operated while the distributor arm 955 is restrained from rotation, since in this position the brush 954 communicates with the first segment. A start magnet 957 connected over control line 961 to the control segment 861 is operable thereby at the same time that the stepping distributor start magnet 863 is operated. The energization of the magnet 957 is adapted to retract armature 956 against the tendency of its spring 959 and to permit distributor arm 955 to make a complete revolution.

The second segment on the ring 950 permanently communicates with a negative source of current which corresponds to the start impulse and forthwith transmits a start impulse and releases the ticker print shaft for a single print operation. The five segments following are electrically connected to the corresponding first five code bars 731 of the stock selector. A lug 967 upon each code bar 731 is adapted to engage a biased contact spring 964 so that when the code bar 731 is in its shifted position connection is broken between the spring 964 and its left contact 965 and established with its right contact 966, correspondingly removing negative potential from the line 965 which leads to its particular segment 962 and introducing positive potential thereunto. In this manner each of the five segments 962 assumes a potential corresponding to the position of its particular pull-bar 731.

The eighth segment corresponds to the sixth code of a ticker such as the one referred to, supra, and functions as a shift signal conditioning the sprint mechanism to subsequently respond in either a letter or figure print operation depending upon whether this impulse is respectively negative or positive. In the present case this segment is permanently connected to negative since the corresponding code signal is to result in a letter recording operation.

The ninth and seventeenth segments are the same as the first and represent the beginning of a new cycle in the ticker. They are accordingly followed by negative start segments five code segments, a no-shift segment, etc., until the twenty-fifth segment is reached which is a stop segment. At this point the three stock letters have been transmitted and the next cycle is to result in a figure print operation. Reference to the abovementioned copending application will reveal that the figures code requires but a four impulse permutation and is terminated with a fifth pulse which is always negative. Accordingly the twenty-sixth segment is a negative start segment, then follow the necessary four figures' segments and a permanently connected fifth code segment communicating with negative potential.

The arrangement of any particular code of transmission is, of course, a purely arbitrary allotment so that while certain of the code combinations herein disclosed may differ from those of corresponding characters of the application referred to, it will be understood that a uniform plan is intended so that the same code combination will result in similar responses on the part of the quotation board as on the ticker.

The thirty-second segment which follows the aforementioned fifth code impulse in contradistinction with the non-shift signals following the letter code segments, is of the opposite polarity and is identified as a shift signal. Following the transmission of this impulse the printer mechanism responds with a shift operation and accordingly a figure is printed on the stock tape instead of a letter as in the previous case. The following or thirty-third segment is a stop segment. The two succeeding print cycles are similar to the one just described and are followed immediately thereafter by the fractions segments 981 of which there are but three and after which there follow two negative segments supplementing the standard five impulse code interval. The final cycle during which the range signal is transmitted requires but two impulses in the ticker, hence there are provided but two connected segments 982. The remaining segments as in the previous case, having no direct effect, are connected to the negative line.

Reference numerals 988 to 990, 992 and 994 indicate stock tickers such as the ones referred to above. Selector magnets 993 to 997 correspond to the polar magnet in the reference, supra. In accordance with the present disclosure the several tickers are variously arranged so that only certain ones of them operate under predetermined conditions. For example, the ticker 988 is provided with a control relay 1001 which in turn is connected to contacts 1007, 1008, 1009 and 1010 carried on the selector banks best indicated in Figure 17 as at 736. Thus when any of these particular stock selections are made effecting any of these contacts by shifting them, then, and then only, the ticker 988 is rendered effective to record the particular stock quotation. The ticker 989 is correspondingly connected to the contacts 1005, 1006 and 1010. Thus, this ticker is effective during the selection of any of the three corresponding stocks. The tickers 990 and 992 are connected to operate, alternatively each from the other, whereby during special stock selection the ticker 990 is rendered operative to the exclusion of the ticker 992 while at all other times the ticker 992 is in operative condition to print all other stock quotations.

It will be seen that in accordance with the present invention there are provided several convenient modes of associating printing mechanisms with the general system. These modes may be varied in accordance with particular requirements as they arise under conditions peculiar to certain brokerage offices, such as for example in the case of stock specialists where only certain stocks are required to be recorded.

It is evident that in the operation of this device the rate of speed at which the tickers are operated is directly dependent on the rate at which the primary distributor 716 is operating and since speed control devices such as may be applied to these and similar systems are well known, it is believed sufficient for the present disclosure to mention that the speed of the two distributors 951 and 716 are suitably controlled. Having described the details of the circuit, the operation of the ticker mechanisms in association with the system will now be described in detail. Upon the storing of the price and range signals in the relays 791 to 809 and the energization of the start magnet 957, when the brush 729 wipes over the segment 861 of the primary distributor, the brushes 953 and 954 together with arm 955 are released for rotation. By the time this has occurred the fifteen contact springs 964 have assumed their respective positions in accordance with the particular stock signals and have accordingly operated to engage either their right or left hand contacts 966 or 965 respectively. The corresponding signals transmitted from these sources of power will be successively received by the particular ticker that has been prepared for operation by the stock selector as already described.

As the brushes 953 and 954 rotate over the sixth segments following each set of five code impulse segments of the letter signals an impulse from the negative side of battery is transmitted restraining the shift operation of the printer. As the brushes rotate over the seventh and eighth segments stop and start impulses are transmitted which as better described in the referred to application serve to maintain the printers in synchronism with the translating distributor 951.

When the brush 954 wipes over the segments 971 circuits are completed corresponding to the storage condition of the relays 791 to 809. These circuits start with battery source 812 over the armature 811 through their respective contacts, the segments 971 of the ring 952, over conductor 983 to the particular stock ticker magnet 993 to 997. The following sixth segments pertaining to a figures signal provoke a shift operation in the selected stock ticker. Similarly over segments 981 a code is transmitted for printing a fractions character and as the brush 954 moves over the final impulse segments 982 a code is transmitted to the printer in accordance with the last storage relays 798 and 799, to print a distinctive mark on the printer tape indicating the type of quotation that has been received. In Figure 25 this indication is symbolized by an arrow mark pointing upward or downward to indicate correspondingly a new high or low quotation price.

Thus is disclosed a system of transmission in which quotation signals are transmitted over a single channel and are effective to operate a plurality of indicators which display quotation prices, and are also effective to be retransmitted over predetermined ones of secondary channels in accordance with the initial characteristic of the quotations themselves. In these secondary channels are located numbers of stock tickers which print the complete quotation including the initial characteristic signals.

Shown in Fig. 8 is a representative code system which may be utilized for the operation of the systems disclosed herein. Of course, to meet particular operating conditions, the code system may be altered to effect certain operations in response to certain code combinations of impulses without departing from the spirit and scope of the present invention. Significant, of course, is the fact that the code system shown in Fig. 8 is intended merely as representative of a code system which might be used, but manifestly other code systems could be developed which would produce equally desirable results.

While in disclosing this invention there is illustrated a number of modifications of the system, and apparatus utilized therein, it will be clear from the above description that this invention may have many other adaptations, and that the present disclosure is but exemplary and by no means inclusive of all of the applications of the present invention. It is therefore intended not to be restricted by the specific disclosure in the foregoing specifications nor by any of the illustrations in the accompanying drawings, but to have included as constituting the present invention all structures coming within a liberal construction of the hereunto appended claims.

I claim:

1. In a signaling system, a first station, a second station, a plurality of sets of indicators at said second station, a plurality of stock tickers at said second station, means for transmitting code combinations of impulses from said first station to said second station, means responsive to said code combinations of impulses at said second station for selecting one of said sets of indicators for operation, said means responsive also to said code combinations of impulses for selectively conditioning said stock tickers for operation whereby the characters will be printed thereby in accordance with the received code combinations of impulses, means for transmitting other code combinations of impulses from said first station, means at said second station responsive to said other code combinations of impulses for variably operating said selected indicators, and means also responsive to said second code combinations of impulses for operating said stock tickers variably to print characters in accordance with the codes.

2. In a signaling system, a first station, a second station, a first distributor at said first station, a plurality of sets of indicators at said second station, selecting mechanism at said second station, means at said first station for transmitting code combinations of impulses from said first to said second station, selector means responsive to said code for partially selecting one of said sets of indicators for operations, means for transmitting a second code from said first station, receiving relays at said second station, means responsive to said code combinations of impulses at said second station, including said distributor thereof for variably operating said receiving relays in accordance to said second code of impulses, a second distributor at said second station, means including said first distributor for starting said second distributor in operation, means including said second distributor for completing the operation of said selector means to condition one of said sets of indicators for operation, a second set of relays, means including said second distributor for transferring the setting of said receiving relays to said second set of relays whereby said first set of relays are released for operation in accordance with a succeeding code, means including said second distributor and said second set of relays for transmitting variable current in accordance with the operation of said second set of relays for operating said selected indicators, and means including said second distributor for restoring said selector means for reoperation in accordance with a succeeding code.

3. In a signaling system, a first station, a second station, a plurality of sets of indicators at said second station, a selector mechanism at said second station, means at said first station for transmitting code combinations of impulses to said second station, means at said second station responsive to said code combinations of impulses for variably operating said selector mechanism, means responsive to the operation of said selectors for conditioning one of said sets of indicators for operation, means at said first station for transmitting other code combination of impulses to said second station, means responsive to said other code combination of impulses for variably operating said selected indicators, and means immediately following the operation of said selector mechanism for conditioning one of said sets of indicators for releasing said selector mechanism for operation in response to a succeeding code combination of impulses while said selected indicator is operated in response to said second set of code combinations of impulses.

4. In a signaling system, a first station, a second station, a plurality of sets of indicators at said second station, a selector mechanism at said second station, means at said first station for transmitting code combinations of impulses to said second station, means at said second station responsive to said code combinations of impulses for variably operating said selector mechanism, means responsive to the operation of said selector mechanism for conditioning one of said sets of indicators for operation, means at said first station for transmitting second code combinations of impulses to said second station, means responsive to said second code combination of impulses for variably operating said selected set of selected indicators, means operative immediately following the conditioning of one of said sets of indicators for releasing said selector mechanism for operation in response to a succeeding code combination of impulses, and means for operating said selected indicators in accordance with a code while a second succeeding code combination of impulses is being received.

5. In a signaling system, a first station, a second station, a plurality of sets of indicators at said second station, selector mechanism at said second station responsive to code signals, means including said selector mechanism for selectively conditioning one of said indicators for operation from said first station, a second selector mechanism responsive to received code signals for variably operating the selected set of indicators, means whereby said first set of selectors are released for operation in accordance to succeeding codes immediately following the selection of a unit, and means whereby said second set of selectors are released for operation in accordance with a succeeding code while the selected indicators are being operated in accordance with the preceding code.

6. In combination, a set of indicators arranged in rows, means for normally locking said indicators from operation, means for simultaneously conditioning all of said indicators for operation, means for operating said indicators individually effective upon the release of said locking means, and means for simultaneously releasing the locking means of one row of said indicators whereby said row is operated in response to said operating means.

7. In combination, a set of indicators arranged in rows, means for simultaneously transmitting currents of variable amplitude and variable direction through all of said indicators, means whereby only one of said rows of indicators is rendered operative in response to said currents and means whereby one of said rows of indicators is invariably operated simultaneously with the operation of any other row of indicators.

8. In an indicator, a disk, a plurality of windings wound on said disk, a field magnet means for transmitting variable currents through said windings permutative combinations of which correspondingly position said disk with respect to said magnet and a brake mechanism operated in accordance with the speed of rotation of said disk for stopping the movement thereof.

9. In combination, a receiver, means responsive to code combinations of impulses for translating said codes into impulses of variable numbers individual to each of said codes, a step by step indicator, means for operating said step by step indicator by said variable numbers of impulses, and means for invariably restoring said indicator to normal before operating said indicator in accordance with the impulses of the succeeding code.

10. In a receiver, a plurality of sets of indicators, means responsive to code combinations of impulses constituting uniform length signals for conditioning one of said sets of indicators for operation, said sets being arranged in rows of indicators, electro magnetic means individual to each row of said indicators, means responsive to code combinations of impulses of uniform length signals for operating one of said electromagnetic means whereby one of said rows of indicators in said selected set is conditioned for operation, means responsive to other code combinations of impulses of uniform length signals for translating said code signals into electrical impulse indicator operating conditions and means for operating said indicators in said selected row of said selected set in accordance with said indicator operating electrical impulse conditions.

11. In a telegraph system, a series of groups of devices, means for transmitting a series of messages, said messages having different characteristics, means controlled by a part of the message to select a group of devices and invariably render one of said devices operative without further operation, means controlled by another part of said message to select another device in the group, corresponding to the character of said message, and means to indicate on the two selected devices information according to the message.

12. In a remote control system, a telegraph circuit, means to transmit a series of signals over said circuit, a remote station, a plurality of rotatable indicators at said station connected to said circuit, means to store a plurality of signals each adapted to control a different one of said indicators, and means to control simultaneously the rotation of said indicators in accordance with said stored signals.

13. In a quotation system, a telegraph circuit, means to transmit consecutively over said circuit a plurality of signals corresponding to digits of a price, a plurality of indicators corresponding to a plurality of item prices, means to transmit over a plurality of circuits impulses under the control of said signals, each circuit corresponding to one of said digits, said indicators comprising a plurality of groups, means controlled by some of said signals to select a group, and means controlled by said impulses to record the price representation of said impulses upon the several indicators of said selected group simultaneously.

14. In combination a plurality of code bars each having a characteristic corresponding to a code signal representing an item, means responsive to each code signal for selecting the code bar corresponding to said signal, a plurality of sets of indicators, electrical connection between each code bar and one of said sets of indicators, and supporting means for said bars whereby each bar may be replaced or rearranged for accordingly replacing or rearranging the item corresponding to any set of indicators.

15. In a receiving apparatus adapted to be controlled from a distant point, the combination of a plurality of groups of rotatable indicators, impulse responsive electromagnetic means for each indicator for operating said indicator forwardly to normal, restoration lines over which impulses are transmitted to said electromagnetic means, a local impulse generator for generating a fixed number of impulses, means for selectively connecting the restoration lines of any group of indicators to said generator for simultaneously restoring all the indicators of a selected group in response to the impulses generated by said generator, and means operated by each indicator as it moves into normal position for preventing surplus impulses from moving said indicator beyond normal position.

16. Automatic broker's board apparatus comprising rotatable indicators for a large plurality of stocks or other items, indicating units being provided for a plurality of digits for each stock or item, means for transmitting current variations successively for selecting and controlling the operation of the several indicator units of one quotation over a relatively small number of channels, means for effectively storing said operation controlling impulses, and means for subsequently utilizing the same to concurrently actuate such of said indicator units as are necessary to post a single new quotation.

17. Automatic broker's board apparatus comprising a large plurality of electromagnetic indicators for posting the varying quotations of stocks or other items, means controlled from a distance for selecting for operation any desired indicators to be reset, local means for generating a fixed number of current impulses for restoring the selected indicators to their normal positions regardless of their former setting, and means controlled from a distance for thereafter resetting said restored indicators to post a new quotation.

18. Automatic broker's board apparatus comprising a large plurality of electromagnetic indicators for posting the varying quotations of stocks or other items, means controlled from a distance for selecting for operation any desired indicators to be reset, means for restoring the selected indicators to a predetermined normal position, said restoring means acting responsive to the selection of the indicators and local means for generating current variations for actuating the restored indicators to cause the same to post a new quotation, the operation of said current variation generating means being controlled from a distance.

19. Automatic broker's board apparatus comprising a large plurality of indicators for posting varying quotations of stocks or other items, a plurality of impulse channels for controlling said indicators from a distance, a plurality of selecting devices for choosing the desired indicator or indicators to be reset, a plurality of impulse storage devices, and connections for bringing said selecting devices successively into operative relationship with said impulse channels and for thereafter bringing said impulse channels successively into operative relationship with said storage devices for effectively storing impulses representative of the new quotation to be posted by the selected indicators.

20. Automatic broker's board apparatus comprising a large plurality of indicating devices for posting the varying quotations of stocks or other items, a relatively small number of impulse channels extending to a distant point for the control of said indicators, a plurality of impulse storage devices acting successively for effectively storing selection and actuation impulses received over said channels, and a plurality of local circuit means for selecting and actuating said indicators concurrently under the control of said storage means respectively to cause several digits of the desired new quotation to be posted concurrently by the indicators.

21. In a stock quotation system, a transmitter, a line to which said transmitter is connected, a receiver connected to said transmitter through said line and responsive to the operation of said transmitter, said receiver including a plurality of groups of stock-registers, each stock-register group corresponding to a separate stock, a group of stock-digit registers in said receiver, a group of price-digit registers in said receiver, means functioning over said line for setting the stock-digit registers and said price-digit registers to indicate a particular stock and a price concerning such stock, stock-selecting apparatus controlled in accordance with the setting of said stock-digit registers to select the corresponding stock, and a local impulse sender controlled in accordance with the setting of the price-digit registers to set up the corresponding price on the stock registers in the selected stock group.

22. In combination, a group of digit registers, means for operating a variable number of said registers to register digits, a sender, and means for operating said sender to send digit impulses corresponding to the digits registered on the operated registers and for transmitting additional impulses indicative of the number of unoperated registers.

23. In a stock-quotation receiver wherein a plurality of groups of stock registers are provided, each stock-register group corresponding to a separate stock, a group of stock-digit registers in said receiver, a group of price-digit registers in said receiver, means for setting the stock-digit registers and said price-digit registers to indicate a particular stock and to indicate a price concerning such stock, stock-selecting apparatus controlled in accordance with the setting of said stock-digit registers to select the corresponding stock, and means for transmitting impulses in accordance with the setting of the price-digit registers to set up the corresponding price on the stock registers in the selected stock group.

24. In a stock-quotation system, a stock-quotation transmitter and a stock-quotation receiver interconnected by a stock-quotation line, means in the transmitter for registering a variable number of characters identifying a stock and for registering characters indicating a quotation concerning such stock, means in the transmitter for translating the said variable number of characters into a fixed number of characters and for transmitting the said fixed number of characters and the quotation-indicating characters over said line to the receiver, groups of indicators in the receiver corresponding to different stocks, respectively, and means in the receiver responsive to the received characters for selecting the corresponding group of indicators and for operating the selected indicators to display the stock quotation.

25. In a stock-quotation system, a stock-quotation receiver having a display board including a number of indicators, some of said indicator groups corresponding to stocks identified by a given number of characters while others of said indicator groups correspond to stocks identified by a different number of characters, a stock-quotation transmitter having registering apparatus for registering the characters identifying any one of said stocks and for registering additional characters indicative of a quotation concerning any registered stock, sending means in said transmitter operable under the control of said registering apparatus for invariably sending for each of the respective characters the same number of impulses regardless of the character, and means in the receiver responsive in any case to the impulses transmitted by the sending means in the transmitter for selecting the group of indicators corresponding to the concerned stock and for operating the indicators to display the desired quotation.

26. In a quotation system, means to transmit successively groups of equal length permutation signals, a series of numeral indicators, means controlled by one of the groups of signals to select an indicator, means responsive to another group of signals for operating a selected indicator to exhibit a predetermined number, and means operative automatically to reestablish said selecting and operating means to a receptive condition for subsequent signals.

27. A code signal system for operating a quotation board comprising a transmitting station, a receiving station, a line connecting said stations, quotation indicators at the receiving station, a transmitter at the transmitting station for sending over the line a series of code signals each consisting of a uniform number of electrical impulses including a code combination for each letter of the alphabet and a code combination for each digit of each of the tens, units and fractions values of the quotation and a code combination for one or more of the opening, closing, high and low quotations, and means at the receiving station responsive to said signals to select and operate predetermined of said quotation indicators.

28. Automatic broker's board apparatus comprising a large plurality of indicating devices for posting the varying quotations of stocks or other items, a relatively small number of impulse channels extending to a distant point for the control of said indicators, a plurality of impulse storage devices acting concurrently for selectively storing impulses received over said channels, a plurality of local circuit means for energizing said indicators concurrently under the control of said storage means respectively to cause several digits of the desired new quotation to be concurrently posted by the indicators, and means operable automatically in timed relation to the setting of said indicators for the display of the desired new quotation to establish a condition whereby said storage devices may be operated in accordance with a subsequent new quotation.

29. Automatic broker's board apparatus comprising a large plurality of indicators for posting various quotations such as "open," "high," "low" and "last" of numerous stocks or other items, means for selectively operating the indicators for the "open," "high," "low" and "last" of any desired stock, and means for concurrently restoring the "open," "high," "low," and "last" indicators of any desired stock.

30. In an automatic stock quotation board, a plurality of indicator groups, each group having a plurality of indicators adapted to display quotations on a particular stock, a distributor controlled by impulses transmitted over a single channel from a master station, a plurality of storage relay groups arranged in a predetermined order, means controlled by said distributor for permitting impulses received by said distributor to be stored in successive storage relay groups, and means for successively utilizing the stored impulses in successive storage relay groups to select the indicator group corresponding to a predetermined stock and to position predetermined indicators in said group.

31. In combination, a plurality of indicators, a selecting mechanism common to said indicators comprising an electrically controlled mechanical selector responsive to selecting permutation code signals, a mechanical member in said selector conditioned in accordance with each individual operation of said selecting mechanism, an electrical circuit controlled upon the mechanical operation of said member, means responsive to operating permutation signals for conditioning said indicators to be operated in accordance with the established electrical circuit, and means responsive to other permutation signals for operating the indicators conditioned for operation through the operation of said signal responsive means.

32. In a stock quotation system, a plurality of groups of indicators, a selector including means responsive to uniform length code signals for selecting any group of indicators for subsequent operation, a rotatable impulse distributor comprising restoration impulse segments and resetting impulse segments, means for successively rendering the respective segments effective, and means controlled by the means in said selector for operatively associating the group of indicators selected thereby with the restoration and resetting impulse segment of said distributor.

33. In a stock quotation system, a plurality of groups of indicators, a selector including means responsive to uniform length code signals for selecting any group of indicators for subsequent operation, a rotatable impulse distributor comprising restoration impulse segments and resetting impulse segments, means for successively rendering the respective segments effective, and a multi-contact relay energized under the control of the means in said selector for operatively connecting the group of indicators selected thereby with the restoration and resetting impulse segments of said distributor.

34. In a telegraph system, a one wire receiving distributor, a series of storage relays operated by impulses received on said distributor, a four wire transmitting distributor for transmitting over said four wires impulses as determined by the contacts of said relays, and means controlled by said receiving distributor for starting said transmitting distributor.

35. In a telegraph system, a one wire receiving distributor, a plurality of storage relays energized by impulses received by said distributor, a four wire transmitting distributor including four segmented rings and a grounding ring, a brush cooperating with said rings, and four wires connecting the segments of each of said rings with the contacts of corresponding storage relays.

36. In a stock-quotation receiver for use in a stock-quotation system, register relays arranged to be variably operated in accordance with stock quotations, an incoming stock-quotation line over which impulses representing stock items and quotations are arranged to be received, a progressively movable distributor arranged to be operated to distribute during each cycle the impulses received over said incoming line to said relays when a stock item and its quotation are being received. stock-quotation indicators, and means for setting up the received quotation on said indicators under the control of said register relays and independently of said distributor.

37. In a stock-quotation receiver for use in a stock-quotation system, an incoming line over which stock quotations are arranged to be received, a plurality of groups of register relays arranged to receive and store the several factors of a stock quotation, a motor-driven distributor arranged to associate during each cycle of operation said incoming line with each of said groups of register relays successively, and means for starting said distributor at the beginning of the receipt of a stock quotation over said line.

38. In a stock-quotation receiver for use in a stock-quotation system, an incoming line over which stock quotations are arranged to be received, a plurality of groups of register relays arranged to record and store the several factors of a stock quotation, a distributor arranged to associate said line with said register relays successively when a stock quotation is being received whereby for each cycle of the distributor the several factors of the quotation are stored in their respective groups of register relays, and means effective at the beginning of the receipt of a stock quotation over said line for starting said distributor into operation, said distributor being arranged to continue its operation independent of further control over said line when it is once started until it has associated said line with all of said groups of register relays.

39. In a stock quotation system, a line over which stock quotations are received in code, each quotation comprising a set of arbitrary digits representing a stock and a plurality of digits representing the price of such stock, a plurality of relay registers, one for each stock digit and one for each price digit, a distributor having a plurality of groups of contact segments. one group for each register, means for operating said distributor upon the receipt of a quotation to close circuits through said segments successively to thereby set said registers in accordance with the digits of the quotation, and means including a sending device for transmitting series of decimal impulses under control of the respective registers.

40. In combination a plurality of permutational relay registers, the relays of each register corresponding to the units of a multiple unit code, a distributor of the rotary type having a contact segment for each relay of the register, means for receiving coded impulses representing digits, means for operating said distributor to distribute said impulses to said relays, via said contact segments thereby setting the registers in accordance with the received digits, and a decimal impulse sender for transmitting impulses as determined by the relay registers.

41. A code signal system for operating a quotation board comprising a transmitting station, a receiving station, a line connecting said stations, quotation indicators at said receiving station for each of the stock items whose quotation is to be displayed with certain indicators allocated to range characteristics of the quotation, a transmitter at said transmitting station for sending over said line a series of signals each consisting of a uniform number of electrical impulses for performing stock selection, price recordation, and price range indication for each stock selection as for one of the opening, closing, high, and low quotations, pluralities of circuits at the receiving station over which signal conditions corresponding to said signals are routed, which signal conditions are responsive to said signals to select and operate predetermined of said quotation indicators.

42. In an indicating system, a master station, a substation, a single line conductor connecting said stations, a series of completely rotatable indicators at said substation having a plurality of angularly disposed settings, means at said master station for transmitting over said conductor equal length code signals representing indicator selection and indicator operating conditions, means at the substation responsive to the signals representative of indicator selection for selecting any one of the plurality of indicators, and further means at said substation responsive to the signals transmitted over said line conductor representative of indicator operating conditions for moving the selected indicator to a selected position in the direction requiring the least travel.

43. In a telegraph system, a transmitter arranged to transmit equal length code signals constituting a message each divided into two parts, an items part and a quotation part, a receiver including means for routing the message in accordance with the items part thereof, means for storing the entire message, and means for subsequently rendering the quotation part of the message as stored in said means effective to display the price represented by said quotation part.

44. In a remote control system, a line channel, a receiving station connected thereto, a plurality of indicators at said receiving station, a transmitter connected to said line channel including instrumentalities for successively transmitting complete messages comprising groups of indicator selecting and indicator operating control signals, means at the receiving station for storing each of said groups of signals, means for preparing in accordance with the group of selecting signals channels to a particular indicator, and means for rendering pluralities of said operating signals effective substantially simultaneously over said prepared channels whereby the particular indicators are correspondingly operated.

45. In a signaling system, a single channel of communication connecting a transmitting station and a receiving station, a cyclically operated transmitter at said transmitting station arranged during each cycle of operation to transmit over said channel, a plurality of groups of signals representing a complete message each group being identified with a particular character, means at the receiving station for storing individually each group of signals, a plurality of other channels at the receiving station, and means for rendering certain of said groups of signals as stored in said means effective simultaneously over said plurality of channels.

46. In a recording and retransmitting mechanism, the combination of selectively settable bars, a receiving distributor for allocating incoming impulses to control the selection of said bars, a plurality of indicators, a plurality of groups of relays, circuits controlled by each bar for simultaneously energizing a relay in each group in accordance with predetermined prepared circuit connections from said bars to said relays, means controlled by the energized relay in one of the groups for determining the indicator to be operated, and means effective subsequently to the energization of said relay for operating the indicator determined to be operated.

47. In a stock quotation system, a transmitter, a line connected to said transmitter, a receiver connected to said transmitter through said line and responsive to the operation of said transmitter, said receiver including a plurality of stock-registers each stock-register group corresponding to a separate stock, a group of stock-digit registers in said receiver, a group of price-digit registers in said receiver, means for setting the stock-digit registers and said price-digit registers to indicate a particular stock and a price concerning such stock, stock-selecting apparatus controlled in accordance with the setting of said stock-digit registers to select the corresponding stock, and means controlled locally in accordance with the setting of the price-digit registers to set up the corresponding price on the stock registers in the selected stock group.

48. Automatic broker's board apparatus comprising rotatable indicators for a large plurality of stocks or other items, indicating units being provided for a plurality of digits for each stock or item, means for transmitting current variations successively for selecting and controlling the operation of the several indicator units of one quotation over a relatively small number of channels, means for effectively storing said operation controlling impulses, means for subsequently utilizing such impulses to actuate concurrently such of said indicator units as are necessary to post a single new quotation, and means whereby said last mentioned means is operated while the transmitting means is effective for transmitting current variations for a succeeding selection of an indicator unit.

49. In a stock quotation system, a first station, a second station, a single line conductor connecting said stations, a plurality of indicators at said second station for displaying quotations, means at the first station for variably transmitting over said line conductor groups of uniform code signals to said second station, means responsive to certain of said code signals for selecting an indicator for operation, storage relay means at the second station responsive to a succeeding group of code signals from said transmitting means for another operation to operate variably indicators at said second station, and means responsive in accordance with a preceding group of code signals for operating the selected indicators while the storage relay means is responding to code signals of a succeeding group of signals.

LOUIS M. POTTS.

CERTIFICATE OF CORRECTION.

Patent No. 2,375,383.  May 8, 1945.

LOUIS M. POTTS.

It is hereby certified that error appears in the printed specification of the above numbered patent requiring correction as follows: Page 1, first column, line 15, after "which" insert the word --will--; page 14, first column, line 37, strike out "described" and insert the same before "in" in same line; page 17, first column, line 39, for "multiplied" read --multipled--; page 22, first column, lines 60 and 61, claim 10, for "indicator operating electrical impulse conditions" read --electrical impulse indicator operating conditions--; and second column, lines 2 and 3, claim 12, strike out the words "connected to said circuit" and insert the same after "station" in line 1, same claim; and that the said Letters Patent should be read with this correction therein that the same may conform to the record of the case in the Patent Office.

Signed and sealed this 25th day of December, A. D. 1945.

(Seal)  Leslie Frazer
First Assistant Commissioner of Patents.